United States Patent
Kondo et al.

(10) Patent No.: US 6,278,385 B1
(45) Date of Patent: Aug. 21, 2001

(54) VECTOR QUANTIZER AND VECTOR QUANTIZATION METHOD

(75) Inventors: Kazunobu Kondo; Kenichi Yamauchi; Eiko Kobayashi, all of Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/495,411

(22) Filed: Jan. 31, 2000

(30) Foreign Application Priority Data

Feb. 1, 1999 (JP) .................................................. 11-024397
Feb. 1, 1999 (JP) .................................................. 11-024398

(51) Int. Cl.$^7$ .................................................. H03M 7/00
(52) U.S. Cl. ............................................. 341/50; 341/200
(58) Field of Search .................................. 341/50, 51, 60, 341/200; 704/200, 205, 207, 214, 220

(56) References Cited

U.S. PATENT DOCUMENTS

| | | | |
|---|---|---|---|
| 5,384,891 | * | 1/1995 | Asakawa et al. ..................... 704/220 |
| 5,502,441 | * | 3/1996 | Swenson ............................... 341/172 |
| 5,517,595 | * | 5/1996 | Kleijn .................................... 704/205 |
| 5,651,090 | * | 7/1997 | Moriya et al. ..................... 704/200.1 |
| 5,841,377 | * | 11/1998 | Takamizawa et al. ................. 341/51 |
| 5,848,387 | * | 12/1998 | Nishiguchi et al. .................. 704/214 |
| 5,873,059 | * | 2/1999 | Iijima et al. .......................... 704/207 |
| 5,983,173 | * | 11/1999 | Inou et al. ............................ 704/219 |
| 5,995,027 | * | 11/1999 | Henry ...................................... 341/50 |
| 6,034,632 | * | 3/2000 | Matsumoto et al. ................. 341/200 |
| 6,064,324 | * | 5/2000 | Shimizu et al. ........................ 341/50 |

FOREIGN PATENT DOCUMENTS 10224342   8/1998   (JP) ................................. H04L/9/18

* cited by examiner

Primary Examiner—Peguy JeanPierre
Assistant Examiner—Jean Bruner Jeanglaude
(74) Attorney, Agent, or Firm—Pillsbury Winthrop LLP

(57) ABSTRACT

A vector quantizer and a vector quantization method are provided, which do not allow the embedding position of the watermark information to be identified easily, and thus enable unfair use of the vector quantized information to be accurately found out. Waveform extraction is performed on input signal data to output extracted waveform data. Index data are generated based on the output extracted waveform data. As index data to be generated based on predetermined extracted waveform data in which no watermark information is to be embedded, out of the output extracted waveform data, index data is randomly selected, which corresponds to the predetermined extracted waveform data from a plurality of index data which, when decoded, have amounts of errors falling within a predetermined range with respect to the predetermined extracted waveform data before decoding.

23 Claims, 17 Drawing Sheets

FIG.11A

| dx0 | dx1 | dx2 | dx3 | dx4 | dx5 | dx6 | dx7 | dx8 | dx9 | dx10 | dx11 | |
|---|---|---|---|---|---|---|---|---|---|---|---|---|
| 08 | F7 | 04 | 06 | FA | 01 | 02 | FC | 04 | 06 | FA | 08 | ... |

| DUMMY | DUMMY | dx0 | dx1 | dx2 | dx3 |
|---|---|---|---|---|---|
| ## | ## | 08 | F7 | 04 | 06 |

FIG.11C

| dx4 | dx5 | dx6 | dx7 | dx8 | dx9 |
|---|---|---|---|---|---|
| FA | 01 | 02 | FC | 04 | 06 |

FIG.11D

| DUMMY | DUMMY | dx0 | dx1 | dx2 | dx3 |
|---|---|---|---|---|---|
| ## | ## | 08 | F7 | 04 | 06 |

FIG.11E

| DUMMY | DUMMY | dx4 | dx5 | dx6 | dx7 |
|---|---|---|---|---|---|
| ## | ## | FA | 01 | 02 | FC |

| dx0 | dx1 | dx2 | dx3 | dx4 | dx5 |
|---|---|---|---|---|---|
| 08 | F7 | 04 | 06 | FA | 01 |

FIG.11G
*PRIOR ART*

| dx6 | dx7 | dx8 | dx9 | dx10 | dx11 |
|---|---|---|---|---|---|
| 02 | FC | 04 | 06 | FA | 08 |

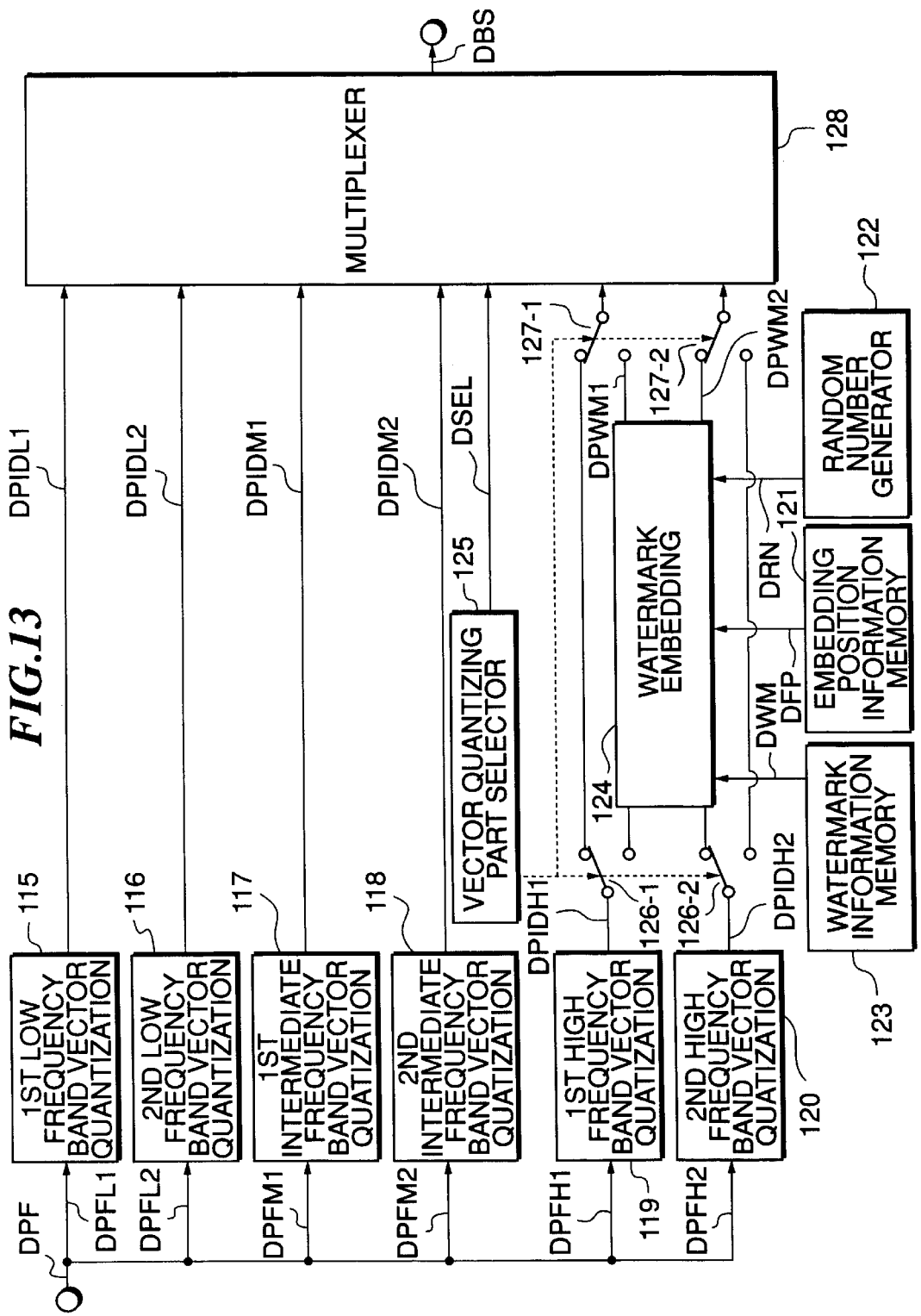

15,16,17,18,19,OR 20

(X=1,2)

36,37,38,39,40,OR 41

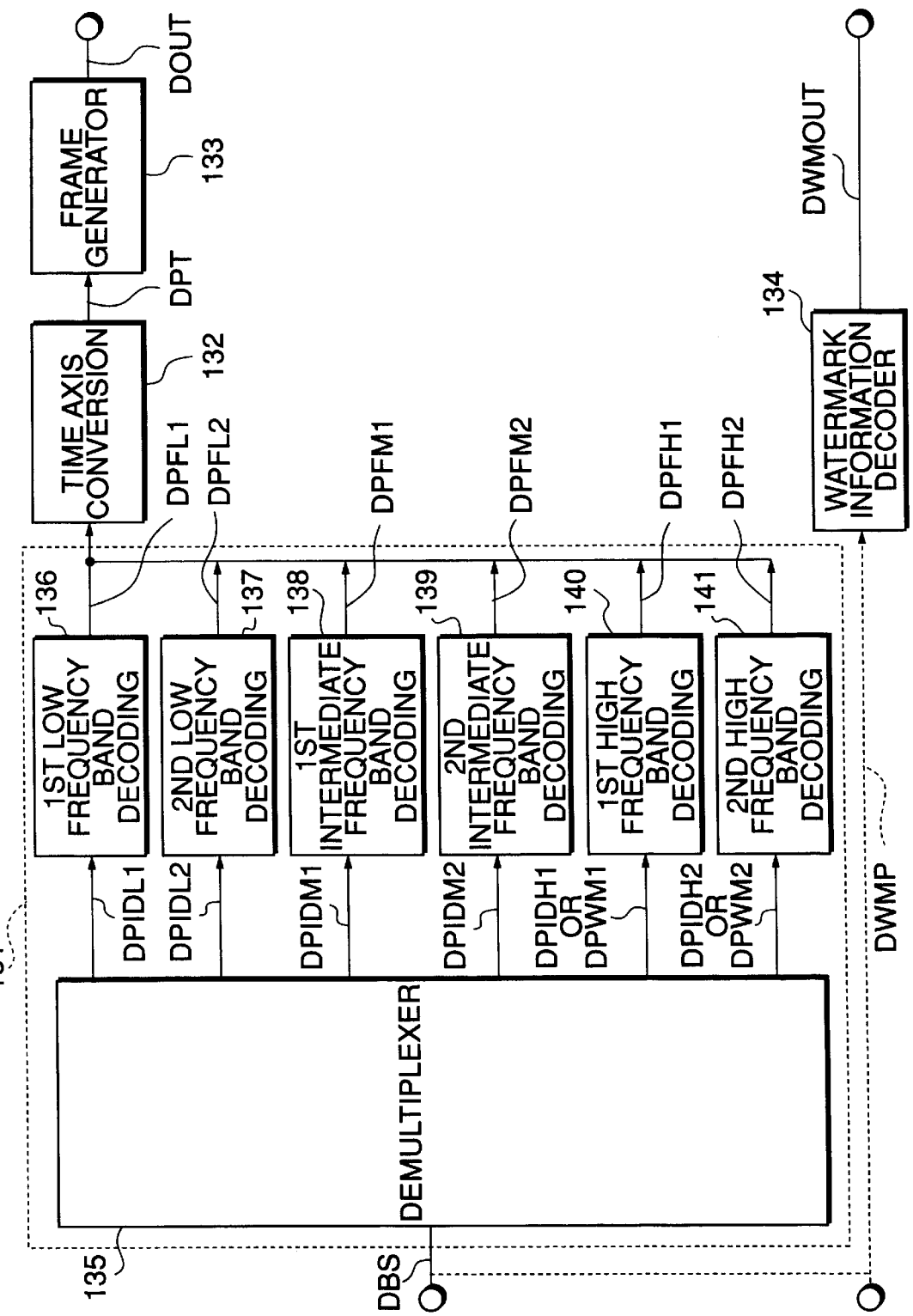

VECTOR QUANTIZER AND VECTOR QUANTIZATION METHOD

BACKGROUND OF THE INVENTION

1. Field of the Invention

This invention relates to a vector quantizer and a vector quantization method, and more particularly to a vector quantizer and a vector quantization method that permit watermark information to be embedded in a coded bit stream in encoding a digital signal such as an audio signal or an image signal.

2. Prior Art

A vector quantizer which permits watermark information to be embedded in a digital code stream consisting of vector quantized indexes in accordance with embedding position designating information, for example, in a designated bit of a 5-bit index, has been proposed (Japanese Laid-Open Patent Publication No. 10-224342). The proposed vector quantizer is constructed such that it selects a quantization vector that has the least distortion with respect to an input vector from among indexes fixed in this manner, and outputs the index representing the selected quantization vector.

The proposed vector quantizer, however, has a drawback that since the embedding position is fixed, the position where the watermark information has been embedded can be identified using difference data obtained by comparing data that is obtained when encoding is performed with the watermark information embedded, with data that is obtained when encoding is performed with no watermark information embedded, for the same input signal string of finite length.

The proposed vector quantizer has another drawback that since the embedding position is determined without taking into consideration the effect on the quality of the reproduced signal, the influence of the embedded watermark information is exerted upon the entire reproduced signal, so that depending on the embedding position of the watermark information, a user may readily recognize degradation of the reproduced signal due to the addition of watermark information.

SUMMARY OF THE INVENTION

It is a first object of the present invention to provide a vector quantizer and a vector quantization method which do not allow the embedding position of the watermark information to be identified easily, and thus enable unfair use of the vector quantized information to be accurately found out.

It is a second object of the present invention to provide a vector quantizer and a vector quantization method which do not allow a user to readily recognize degradation of the reproduced signal due to addition of watermark information.

To attain the first object, according to a first aspect of the present invention, there is provided a vector quantizer for performing vector quantization on input signal data, comprising a waveform extracting device that performs waveform extraction on the input signal data to output extracted waveform data, and an index generating device that generates index data based on the output extracted waveform data, wherein as index data to be generated based on predetermined extracted waveform data in which no watermark information is to be embedded, out of the output extracted waveform data, the index generating device randomly selects index data corresponding to the predetermined extracted waveform data from a plurality of index data which, when decoded, have amounts of errors falling within a predetermined range with respect to the predetermined extracted waveform data before decoding.

To attain the first object, according to a second aspect of the present invention, there is provided a vector quantizer for performing conjugate structure vector quantization on input signal data, comprising a waveform extracting device that performs waveform extraction on the input signal data to output extracted waveform data, and an index generating device that generates index data based on the output extracted waveform data, wherein as a combination of index data to be generated based on predetermined extracted waveform data in which no watermark information is to be embedded, out of the output extracted waveform data, the index generating device randomly selects a combination of index data corresponding to the predetermined extracted waveform data from a plurality of combinations of index data which, when decoded, have amounts of errors falling within a predetermined range with respect to the predetermined extracted waveform data before decoding.

Preferably, the vector quantizer according to the first or second aspect further comprises a dummy data adding device that adds dummy data to a portion of the extracted waveform data when generating the extracted waveform data.

Preferably, the vector quantizer according to the first aspect comprises a first vector quantizing device to an n-th vector quantizing device (n is an integer not less than 2) for performing multistage vector quantization.

More preferably, at least one of the first vector quantizing device to the n-th vector quantizing device includes a dummy data adding device for adding dummy data to a portion of the extracted waveform data when generating the extracted waveform data.

Also preferably, the extracted waveform data is formed of a predetermined finite number of sample data, and wherein the dummy data adding device divides the input signal data into a plurality of divided data each formed of a predetermined number of sample data smaller than the predetermined finite number of sample data, the dummy data adding device adding the dummy data to each of the plurality of divided data to thereby generate the extracted waveform data formed of the predetermined finite number of sample data.

More preferably, the number of the sample data of the dummy data is different between when the divided data has watermark information embedded therein and when the divided data has no watermark information embedded therein.

The dummy data adding device repeatedly adds the dummy data formed of a predetermined fixed number of sample data to the divided data until the divided data becomes formed of sample data equal in number to the predetermined finite number.

The dummy data adding device may add, as the dummy data, calculated data obtained by performing a predetermined operation based on the divided data and formed of a number of sample data being equal to a difference between a number of sample data of the extracted waveform data and a number of sample data of the divided data.

The calculated data may be calculated by extrapolation operation, or it may be calculated by interpolation operation.

To attain the first object, according to a third aspect of the present invention, there is provided a vector quantization method for performing vector quantization on input signal data, comprising the steps of performing waveform extraction on the input signal data to output extracted waveform data, and generating index data based on the output extracted waveform data, wherein as index data to be generated based on predetermined extracted waveform data in which no watermark information is to be embedded, out of the output extracted waveform data, the index generating step randomly selects index data corresponding to the predetermined extracted waveform data from a plurality of index data which, when decoded, have amounts of errors falling within a predetermined range with respect to the predetermined extracted waveform data before decoding.

To attain the first object, according to a fourth aspect of the present invention, there is provided a vector quantization method for performing conjugate structure vector quantization on input signal data, comprising, comprising the steps of performing waveform extraction on the input signal data to output extracted waveform data, and generating index data based on the output extracted waveform data, wherein as a combination of index data to be generated based on predetermined extracted waveform data in which no watermark information is to be embedded, out of the output extracted waveform data, the index generating step randomly selects a combination of index data corresponding to the predetermined extracted waveform data from a plurality of combinations of index data which, when decoded, have amounts of errors falling within a predetermined range with respect to the predetermined extracted waveform data before decoding.

Preferably, the vector quantization method according to the third or fourth aspect further comprises the step of adding dummy data to a portion of the extracted waveform data when generating the extracted waveform data.

To attain the second object, according to a fifth aspect of the present invention, there is provided a vector quantizer for performing vector quantization on input signal data, comprising a time axis/frequency axis conversion and waveform extraction device that performs time axis/frequency axis conversion and waveform extraction on the input signal data to output frequency axis extracted waveform data, and an index generating device that performs vector quantization on the output frequency axis extracted waveform data to generate index data, wherein the index generating device adds watermark information data to at least one of a plurality of the frequency axis extracted waveform data corresponding to at least one frequency band component higher than a predetermined frequency.

In a preferred form of the vector quantizer according to the fifth aspect, the index generating device comprises a plurality of code books storing the index data in advance, and a plurality of encoding devices that assign the index data stored in respective corresponding ones of the code books to the frequency axis extracted waveform data, and wherein as index data to be assigned to the frequency axis extracted waveform data, one of the plurality of encoding devices corresponding to one frequency band component higher than the predetermined frequency randomly selects index data from a plurality of index data which, when decoded, have amounts of errors falling within a predetermined range with respect to the extracted waveform data before decoding, from among the index data stored in one of the code books corresponding to the one encoding device.

In another preferred form of the vector quantizer according to the fifth aspect, the index generating device comprises a plurality of code books storing the index data in advance, and a plurality of encoding devices that assign the index data stored in respective corresponding ones of the code books to the frequency axis extracted waveform data, and wherein in a case that there are a plurality of the encoding devices corresponding to frequency band components higher than the predetermined frequency, as index data to be assigned to the frequency axis extracted waveform data, at least one encoding device which is randomly selected from the plurality of encoding devices randomly selects index data from a plurality of index data which, when decoded, have amounts of errors falling within a predetermined range with respect to the extracted waveform data before decoding, from among the index data stored in at least one of the code books corresponding to the at least one encoding device.

To attain the second object, according to a sixth aspect of the present invention, there provided a vector quantizer for performing vector quantization on input signal data, comprising a time axis/frequency axis conversion and waveform extraction device that performs time axis/frequency axis conversion and waveform extraction on the input signal data to output frequency axis extracted waveform data, and a watermark information adding device that adds watermark information data to at least one of a plurality of the output frequency axis extracted waveform data which contains in large amounts frequency band components higher than a predetermined frequency, among frequency band components contained in the plurality of the output frequency axis extracted waveform data.

To attain the second object, according to a seventh aspect of the present invention, there is provided a vector quantizer as claimed in claim 18, further comprising a time axis/frequency axis conversion device that performs time axis/frequency axis conversion on the input signal data to output frequency axis input signal data, and an interleave and waveform extraction device that interleave the frequency axis input signal data to generate interleaved frequency axis input signal data, and performs waveform extraction on the interleaved frequency axis input signal data to output frequency axis extracted waveform data.

Preferably, the vector quantizer according to the seventh aspect further comprises a watermark information adding device that adds watermark information data to at least one of a plurality of the output frequency axis extracted waveform data which contains in large amounts frequency band components higher than a predetermined frequency, among frequency band components contained in the plurality of the output frequency axis extracted waveform data.

In the vector quantizer according to the fifth to seventh aspects, typically the input signal data is audio data, and preferably the predetermined frequency is set based on human auditory sensation to a frequency at or above which little influence of watermark information can be exerted upon human auditory sensation To attain the second object, according to an eighth aspect of the present invention, there is provided a vector quantization method for performing vector quantization on input signal data, comprising the steps of performing time axis/frequency axis conversion and waveform extraction on the input signal data to output frequency axis extracted waveform data, and performing vector quantization on the output frequency axis extracted waveform data to generate index data, wherein the index generating step adds watermark information data to at least one of a plurality of the frequency axis extracted waveform data corresponding to at least one frequency band component higher than a predetermined frequency.

To attain the second object, according to a ninth aspect of the present invention, there is provided a vector quantization method for performing vector quantization on input signal data, comprising the steps of performing time axis/frequency axis conversion and waveform extraction on the input signal data to output frequency axis extracted waveform data, and adding watermark information data to at least one of a plurality of the output frequency axis extracted waveform data which contains in large amounts frequency band components higher than a predetermined frequency, among frequency band components contained in the plurality of the output frequency axis extracted waveform data.

The above and other objects, features and advantages of the invention will become more apparent from the following detailed description taken in conjunction with the accompanying drawings.

BRIEF DESCRIPTION OF THE DRAWINGS

FIGS. 11A to 11G are views showing extracted waveform data;

FIG. 13 is a block diagram showing in detail the construction of vector quantizing parts and encoding parts;

FIG. 15 is a block diagram showing in detail the construction of a vector decoder;

DETAILED DESCRIPTION OF PREFERRED EMBODIMENTS

The present invention will now be described in detail with reference to drawings showing embodiments thereof.

Figure 1:
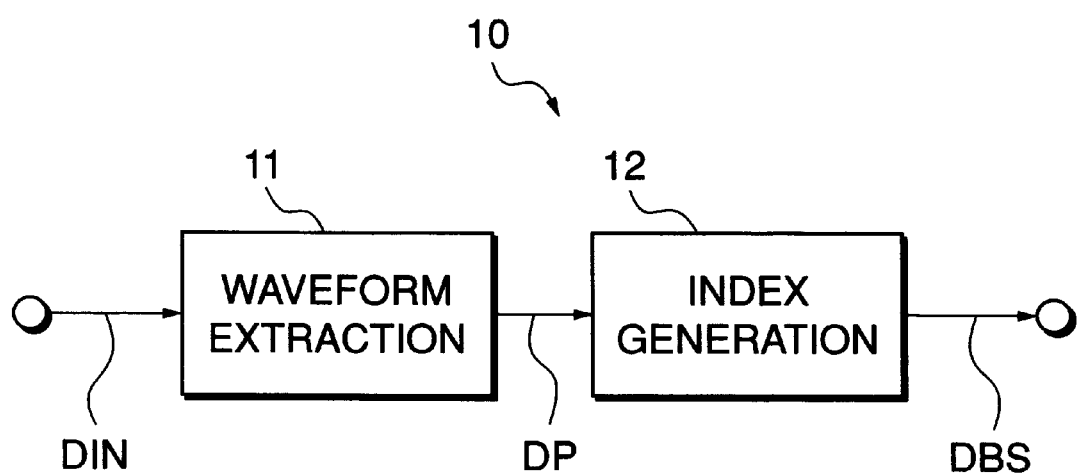
FIG. 1 is a block diagram schematically showing the construction of a vector quantizer according to a first embodiment of the present invention.

FIG. 1 is a block diagram schematically showing the construction of a vector quantizer according to a first embodiment of the present invention. The vector quantizer 10 is comprised of a waveform extracting device 11 that performs waveform extraction on input signal data DIN and outputs extracted waveform data DP, and an index generating device 12 that generates an index based on the extracted waveform data DP and outputs it as bit stream data DBS.

Figure 2:
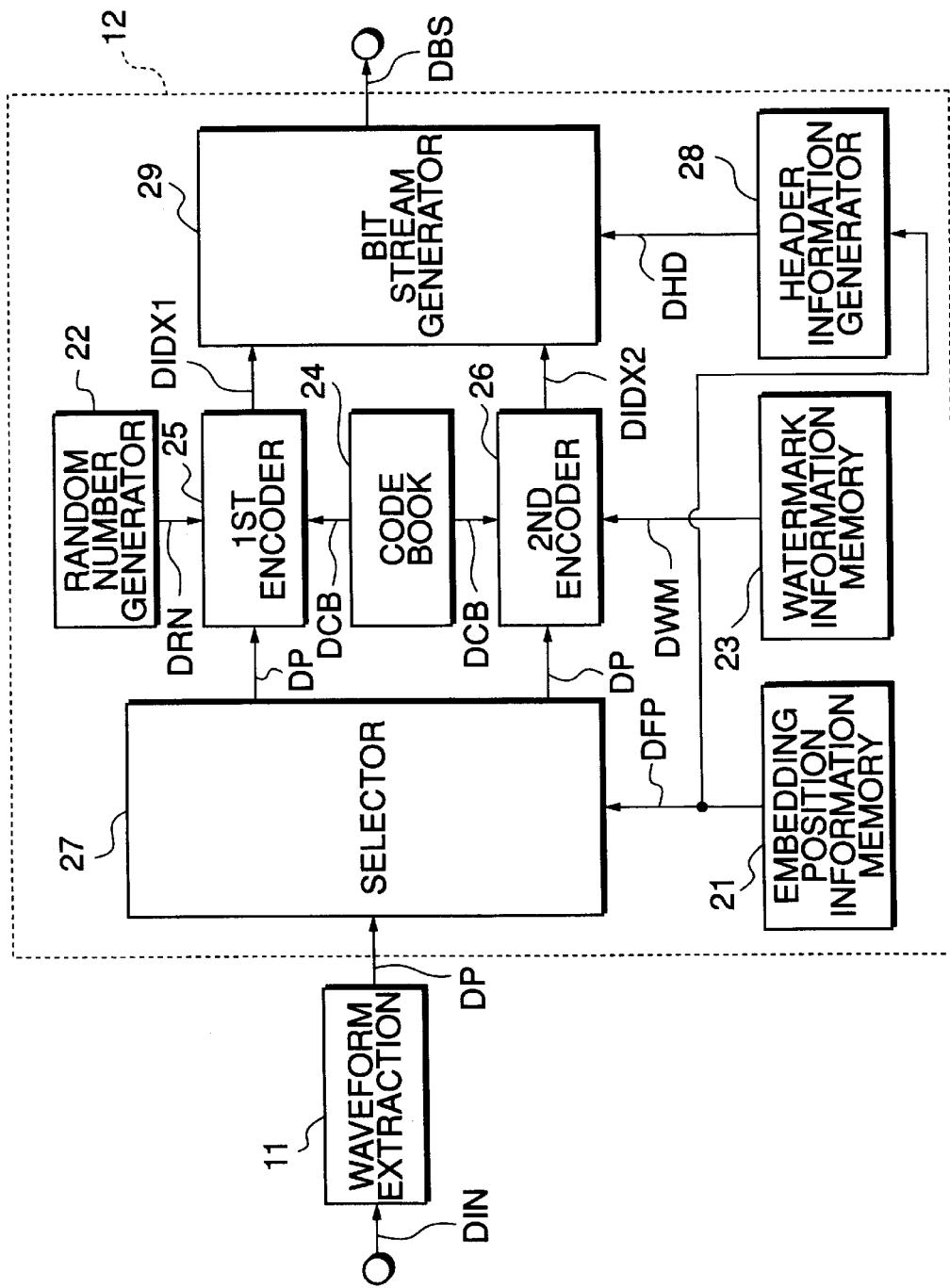
FIG. 2 is a block diagram showing in detail the construction of an index generating device 12 in FIG. 1.

FIG. 2 shows in detail the construction of the index generating device 12.

The index generating device 12 is comprised of an embedding position information memory 21 that stores embedding position data DFP for watermark information, a random number generator 22 that generates and outputs random number data DRN, a watermark information memory 23 that stores watermark information data DWM in advance, a code book 24 that stores index data DCB, a first encoder 25 that selects n-th candidate index data (n is a natural number) corresponding to the random number data from among a plurality of candidate index data corresponding to the extracted waveform data DP based on the entered extracted waveform data DP, random number data DRN and index data DCB, and outputs the n-th candidate index data as first index data DIDX1, a second encoder 26 that selects index data corresponding to the entered extracted waveform data DP and watermark information data DWM and outputs it as second index data DIDX2, a selector 27 that outputs, based on the embedding position data DFP, the extracted waveform data DP not corresponding to the embedding position to the first encoder 25 and the extracted waveform data DP corresponding to the embedding position to the second encoder 26, a header information generator 28 that generates and outputs header information data DHD based on the embedding position data DFP, and a bit stream generator 29 that rearranges serially the header information data DHD, the first index data DIDX1 output from the first encoder 25 and the second index data DIDX2 output from the second encoder 26 into serial data, and outputs the serial data as bit stream data DBS.

Next, the operation of the vector quantizer constructed as above will be described.

The waveform extracting device 11 performs waveform extraction on the input signal data DIN, and outputs the extracted waveform data DP to the selector 27 of the index generating device 12.

On the other hand, the embedding position information memory 21 of the index generating device 12 outputs the stored embedding position data DFP for watermark information to the selector 27 as well as to the header information generator 28.

The selector 27 outputs, based on the embedding position data DFP, the extracted waveform data DP not corresponding to the embedding position to the first encoder 25 and the extracted waveform data DP corresponding to the embedding position to the second encoder 26.

The random number generator 22 generates the random number data DRN and outputs it to the first encoder 25, while the watermark information memory 23 outputs the stored watermark information data DWM sequentially to the second encoder 26.

The first encoder 25 selects the n-th candidate index data (n is a natural number) corresponding to the random number data DRN from among a plurality of candidate index data representing the extracted waveform data DP, based on the entered extracted waveform data DP, the random number data DRN and the index data DCB that is read out from the code book 24, and outputs the n-th candidate index data as the first index data DIDX1 to the bit stream generator 29.

More specifically, the indexes corresponding to the extracted waveform data DP are classified such that the index having the least error is set as the first candidate index, and other indexes are set as second candidate index, third candidate index, and so on in the order of the magnitude of error (the same magnitude of error inclusive). From among a plurality of candidate indexes thus obtained and having amounts of errors falling within a predetermined range, one candidate index is selected based on the random number data DRN, and output as the first index data DIDX1 to the bit stream generator 29.

Thus, the first candidate index having the least error is not necessarily selected, so that the first index data can act as decoy index data, which makes it difficult to find out the actually embedded watermark information.

The second encoder 26 reads out the index data corresponding to the entered extracted waveform data DP and the watermark information data DWM from the code book 24, and selects appropriate index data and outputs it as the second index data DIDX2 to the bit stream generator 29.

More specifically, for example, when the watermark information data DWM is such that the fourth bit of index data is set to be "1", an index having the least error is selected from among a plurality of index data that have "1" as the fourth bit as the second index data DIDX2, and output to the bit stream generator 29.

The operation of the header information generator 28 will next be explained with reference to FIG. 3A.

Figure 3A:
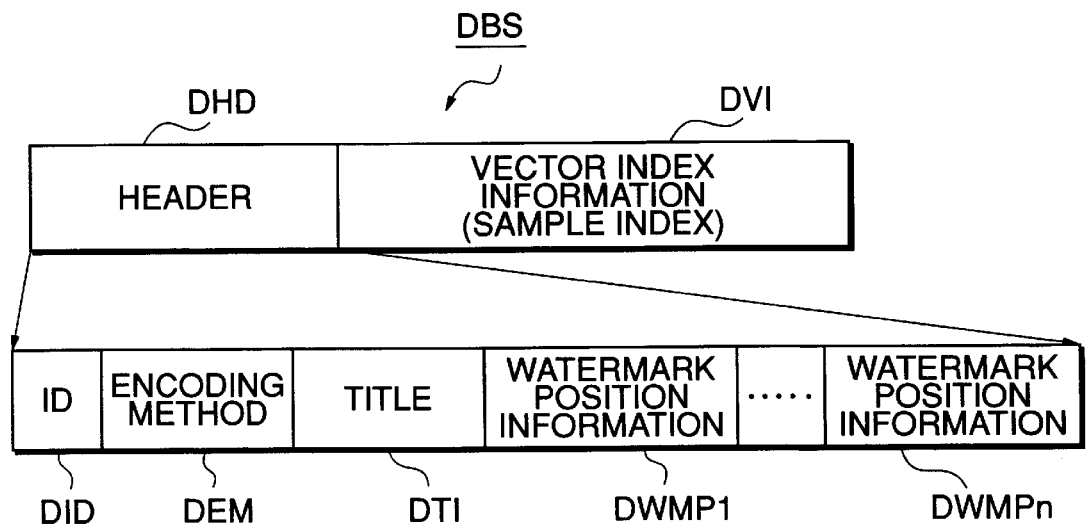
FIG. 3A is a view useful in explaining the structure of bit stream data DBS.

FIG. 3A is a view explaining the structure of bit stream data DBS.

The bit stream data DBS is generally comprised of header information data DHD, and vector index information data DVI.

The header information data DHD is comprised of, for example, ID data DID that has a unique value never duplicated throughout the world to identify the present vector quantizer 10, encoding method data DEM indicating the method of encoding, title data DTI indicating a title corresponding to the bit stream data DBS in question, and m pieces of watermark position information data DWMP1~DWMPm indicating positions where the watermark information is embedded.

Here, "GUID(Global Unique ID)" or the like is used as the ID data DID.

Items of the header information data DHD other than the ID data DID may be encrypted by a predetermined encrypting method.

Data to be included in the header information data DHD are not limited to the above described data, but may include various other data as required.

Next, a vector decoder will be described with reference to FIG. 4.

Figure 4:
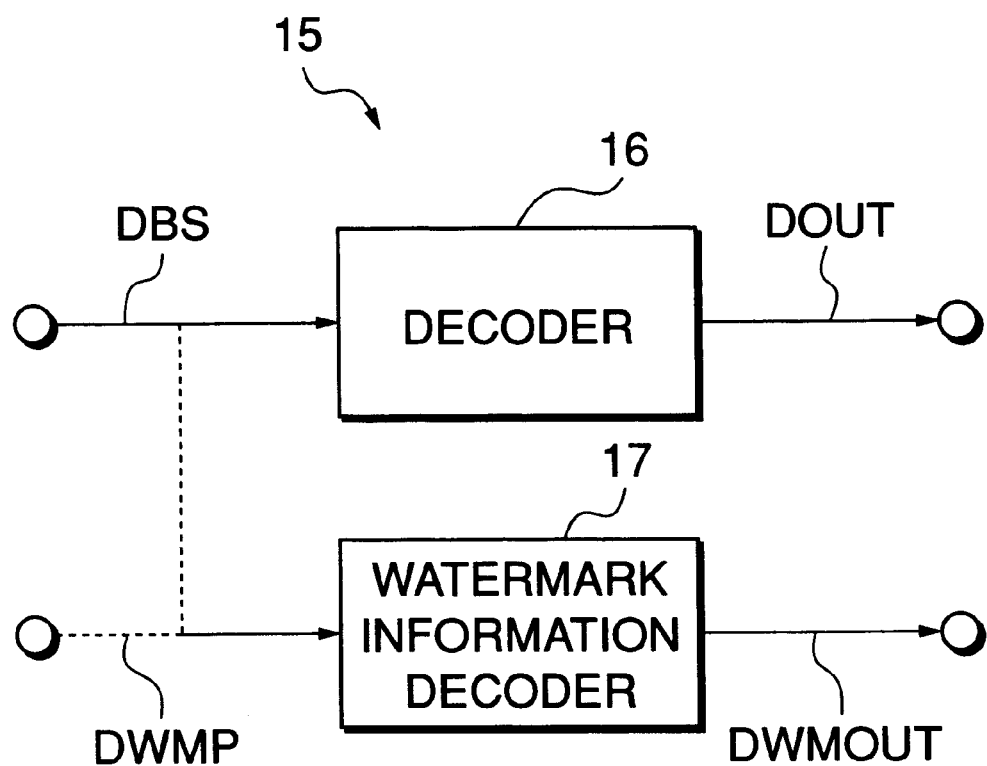
FIG. 4 is a block diagram schematically showing the construction of a vector decoder part.

FIG. 4 is a block diagram schematically showing the construction of a vector decoder.

The vector decoder 15 is comprised of a decoder 16 that decodes the entered bit stream data DBS (see FIG. 3A) by a decoding method corresponding to the encoding method as indicated by the encoding method data DEM or by a predetermined decoding method and outputs the decoded bit stream data DBS as output signal data DOUT, and a watermark information decoder 17 that outputs output watermark information data DWMOUT based on watermark position information data DWMP (=any of the watermark position information data DWMP1~DWMPm in the bit stream data DBS, or watermark position information data entered from an external watermark position information database, not shown).

The watermark information decoder 17 need not be included in a decoder for general users or the like where the watermark information is not necessarily required.

Before explaining the vector decoder, the structure of bit stream data DBS' will be described, which is applied in the case where the watermark position information data is entered from the external watermark position information database.

Figure 3B:
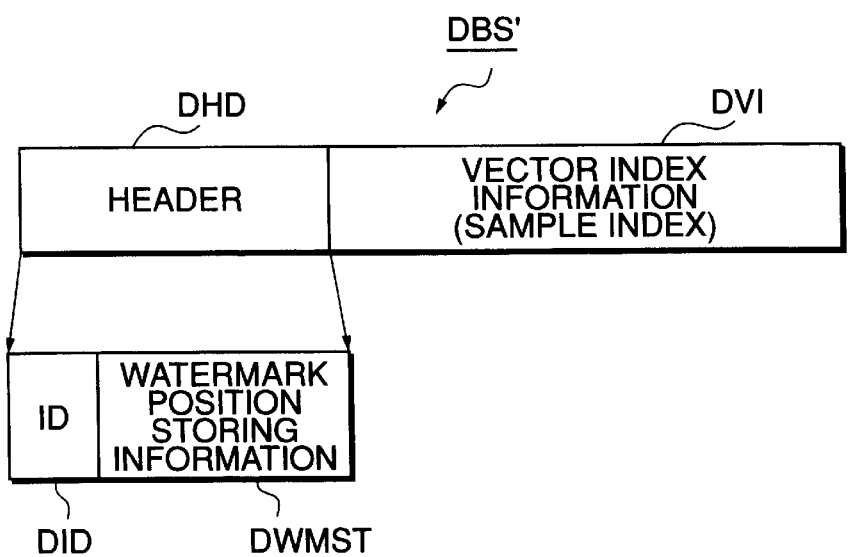
FIG. 3B is a view useful in explaining the structure of bit stream data DBS'.

As shown in FIG. 3B, the bit stream data DBS' is generally comprised of header information data DHD, and vector index information data DVI.

The header information data DHD is comprised of, for example, IDD data DID that has a unique value never duplicated throughout the world to identify the present vector quantizer 10, and watermark position storing information data DWMST that indicates the storing position of the watermark information in the watermark position information database. "GUID(Global Unique ID)" or the like is used as the ID data DID in this case as well.

The watermark position storing information data DWMST may be encrypted using a predetermined encrypting method.

Data to be included in the header information data DHD are not limited to the above-described data, but various other data may be included as required.

Upon delivery of the watermark position storing information data DWMST to the watermark position information database, the watermark position information database outputs watermark position information data DWMP corresponding to the watermark position storing information data DWMST to the watermark information decoder 17.

Thus, the bit stream data DBS' does not directly contain information concerning the embedding position of the watermark information, so that the security of the data can be more highly ensured.

Next, the operation of the vector decoder constructed as above will be described.

The decoder 16 of the vector decoder 15 decodes the entered bit stream data DBS by a decoding method corresponding to the encoding method as indicated by the encoding method data DEM or by a predetermined decoding method, and outputs the decoded bit stream data DBS as output signal data DOUT.

A user can then reproduce an image, voice or a like signal corresponding to the output signal data DOUT.

On the other hand, the watermark information decoder 17 outputs the output watermark information data DWMOUT based on the watermark position information data DWMP (=any of the watermark position information data DWMP1~DWMPm in the bit stream data DBS, or watermark position information data entered from an external watermark position information database, not shown).

If copyright information or the like is included as the output watermark information data DWMOUT, the source of the output signal data DOUT in question or the like can be easily identified.

According to the first embodiment, as described above, when the index data corresponding to the non-embedding position of the watermark information is selected in vector quantization, selection is performed randomly using a random number from among a plurality of candidate indexes that have errors within a predetermined range, in addition to the first candidate index having the least error. Therefore, even if difference data is obtained by comparing bit stream data generated with no watermark information embedded therein with bit stream data generated with watermark information embedded therein, the difference data contains information other than the watermark information so that it is difficult to extract the watermark information from the difference data. Thus, it is possible to obtain bit stream data having watermark information more resistant to malicious attack such as tampering and erasure of the watermark information.

Although only the case where watermark information is embedded has been illustrated in the above described embodiment, the situation is the same with the case where watermark information is not embedded at all. The vector quantizer may be constructed such that the selection of the index data in the first encoder is performed randomly using a random number from among a plurality of indexes that have errors within a predetermined range, in addition to the first candidate index having the least error. Then, even if a malicious attacker obtains difference data by comparing the bit stream data generated with no watermark information embedded therein with the bit stream data generated with watermark information embedded therein, the difference data contains information other than the watermark information, making it difficult to extract the watermark information. Thus, it is possible to obtain bit stream data having watermark information more resistant to malicious attack such as tampering and erasure of the watermark information.

Although in the above described embodiment, watermark information is assumed to be embedded in a part of index data, it is also possible to construct the vector quantizer such that watermark information is embedded in all index data.

Next, a second embodiment of the present invention will be described.

In the first embodiment described above, no processing operation is performed on the input signal data DIN entered to the waveform extracting device 11. In the second embodiment, the input signal data DIN is one or more finite length sample streams (in the case of audio data, for example, 16 bits per sample stream), and dummy data is added to the top of each finite length sample stream before waveform extraction is performed, with the dummy data having different numbers of samples between when watermark information is embedded and when no watermark information is embedded.

For the sake of understanding, the case where the input signal data is audio data will be described hereinbelow. The invention is, however, not limited to audio data, but is equally applicable to image or other data.

Before specific explanation of the second embodiment, the principle of the second embodiment will be briefly described.

Figure 5:
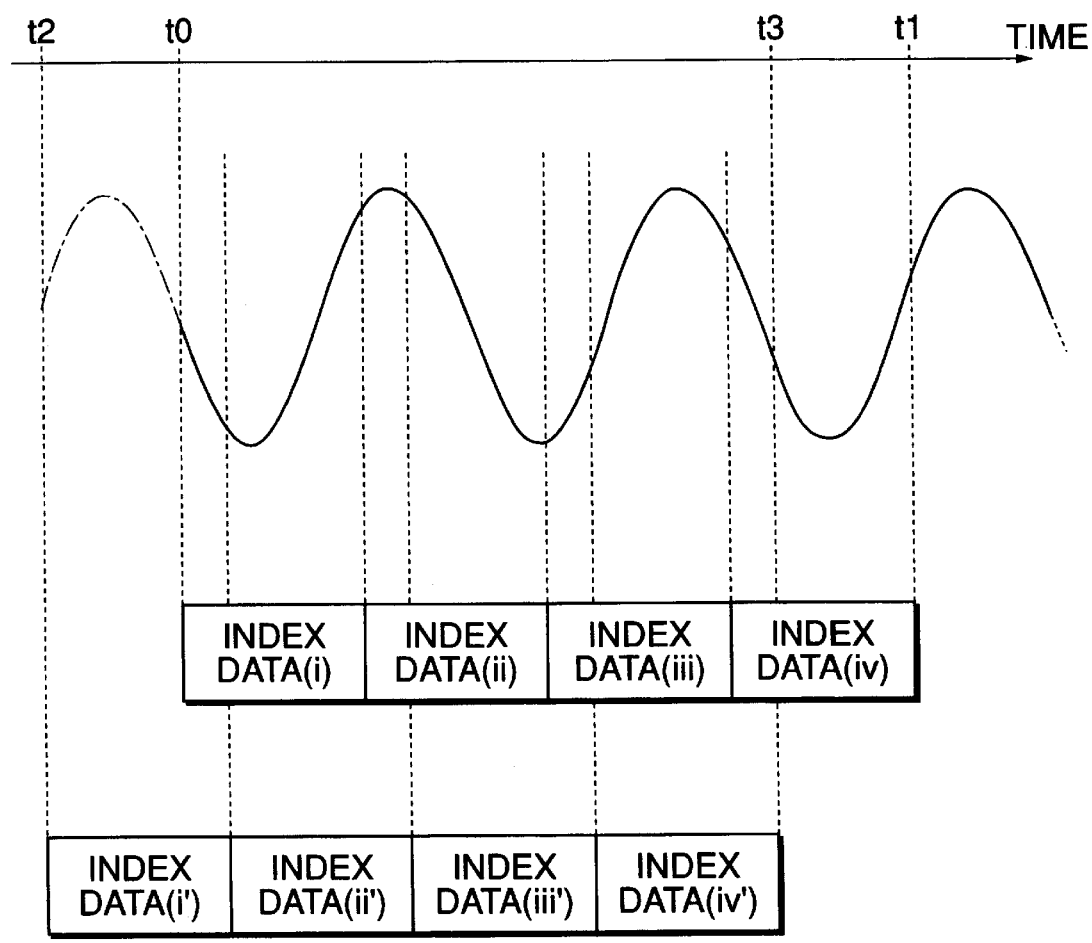
FIG. 5 is a view useful in explaining dummy data.

FIG. 5 is a view useful in explaining the principle of the second embodiment.

Suppose that an input signal waveform corresponding to the input signal data DIN is represented by the solid line in an upper portion of FIG. 5. If a portion of the input signal data DIN entered from time t0 to time t1 is regarded as a finite length sample stream, index data obtained by performing vector quantization on the finite length sample stream from the top thereof will be represented by index data (i)–(iv) corresponding to the input signal waveform.

On the other hand, if dummy data of a predetermined number of samples are added to the top of the finite length sample stream in question (in FIG. 5, a signal waveform corresponding to the dummy data is shown with a chain line), index data obtained by performing vector quantization on a finite length sample stream corresponding to input signal data DIN entered from time t2 to time t3 (t3−t2=t1−t0) will be represented by index data (i')–(iv'), which is quite different from the index data (i)–(iv).

The second embodiment is based on this finding, and according to the second embodiment, the number of samples of dummy data added to the top of the finite length sample stream when watermark information is embedded is different from the number of samples of dummy data added to the top of the finite length sample stream when watermark information is not embedded. Thus, even if a malicious attacker obtains difference data by comparing the bit stream data generated with no watermark information embedded therein with the bit stream data generated with watermark information embedded therein, the difference data contains information other than the watermark information, making it difficult to extract the watermark information.

The operation of the vector quantizer according to the second embodiment will now be described.

Since the operation of the vector quantizer according to the second embodiment after the waveform extraction is the same as in the first embodiment, its detailed description is omitted and only the process before the waveform extraction will be described hereinbelow.

Figure 6:
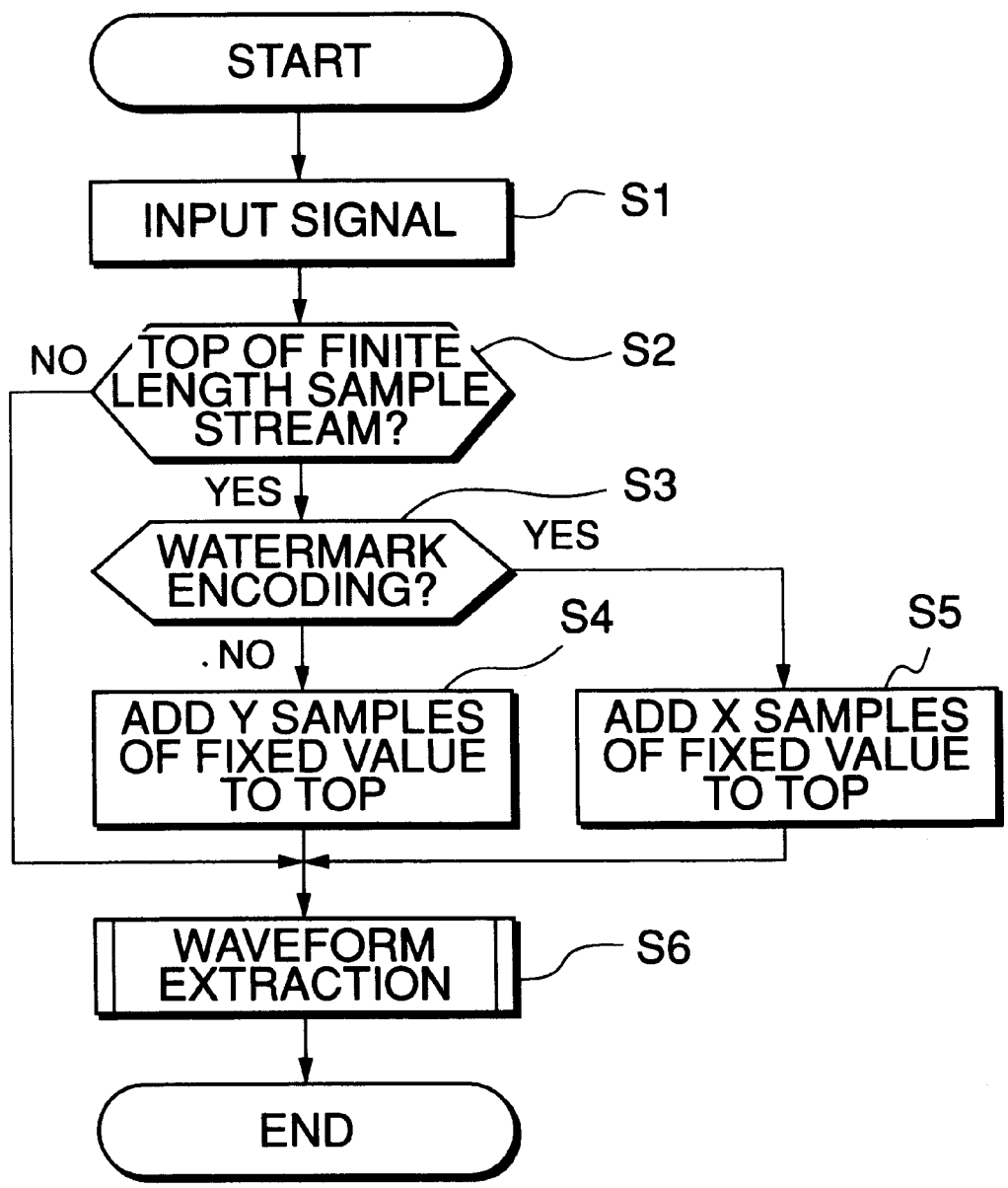
FIG. 6 is a flow chart showing a flow of the operation of a second embodiment of the present invention.

FIG. 6 is a flow chart showing the process leading to waveform extraction in the second embodiment.

When input signal data DIN is entered (step S1), it is determined whether the entered data is at the top of a finite length sample stream (step S2), and if the data is not at the top of a finite length sample stream (step S2: No), the process proceeds to a step S6.

Here, the input signal data DIN as a whole may be set as one finite length sample stream formed of a predetermined finite number of sample data, or alternatively, the input signal data DIN may be divided into a plurality of divided data each formed of a predetermined number of sample data smaller than the predetermined finite number of sample data, and each divided data thus obtained may be set as a finite length sample stream.

For example, if the number L of sample data in the finite length sample stream is set as L=(the number of sample data in the extracted waveform data DP)−(the number of sample data in the dummy data), the number of sample data of extracted waveform data with addition of dummy data can be made equal to the number of sample data of extracted waveform to which no dummy data is added.

If it is determined in the step S2 that the entered data is at the top of a finite length sample stream (step S2: Yes), it is determined whether encoding is to be performed with watermark information embedded (step S3).

If it is determined in the step S3 that (watermark) encoding is to be performed with watermark information embedded (step S3: Yes), X samples (X is a natural number) of a fixed value, for example "00h" (hereinafter h refers to hexadecimal notation), are added as dummy data to the top of data.

On the other hand, if it is determined in the step S3 that ordinary encoding is performed with no watermark information embedded (step S3: No), Y samples (Y is a natural number, and Y≠X) of a fixed value, for example "00h" (=8 bits), are added as dummy data to the top of data.

Then, waveform extraction is performed on the data with or without dummy data added (step S6), and the process proceeds to encoding.

The above described process will be explained more in detail. Although the data length of one sample data is assumed to be 8 bits in the following explanation, the present invention is not limited to this data length, but is applicable to any data length such as 16 bits, 32 bits, 64 bits and so forth.

(1) The case where dummy data is added to the top of input data:

When (watermark) encoding is performed with watermark information embedded, if, as shown in FIG. 11A, the entered finite length sample stream is "08h", "F7h", "04h", "06h", "FAh", "01h", "02h", "FCh", "o4h", "06h", "FAh", ..., X=2, the number of samples in the extracted waveform data is 6 (equivalent to data length of 48 bits), and the value of dummy data is "##h" (actually any sample data such as "00h" or the like may be used; but, for the sake of explanation, hereinafter denoted as "##h"), then first extracted waveform data will be obtained, which, as shown in FIG. 11B, are "##h", "##h", "08h", "F7h", "04h", "06h". Accordingly, second extracted waveform data will be obtained, which, as shown in FIG. 11C, are "FAh", "01h", "02h", "FCh", "04h", "06h".

On the other hand, when dummy data is not added (prior art), the first extracted waveform data obtained will be, as shown in FIG. 11F, "08h", "F7h", "04h", "06h", "FAh", "01h", and the second extracted waveform data obtained will be, as shown in FIG. 11G, "02h", "FCh", "04h", "06h", "FAh", ...

Thus, the extracted waveform data obtained with dummy data added is quite different from the extracted waveform data obtained with no dummy data added (prior art).

When ordinary encoding is performed with no watermark information embedded, if, as shown in FIG. 11A, the entered finite length sample stream is "08h", "F7h", "04h", "06h", "FAh", "01h", "02h", "FCh", "04h", "06h", "FAh", ..., Y=3, the number of samples in the extracted waveform data is 6, and the value of dummy data is "##h", then the first extracted waveform data will be, in the same manner as above, "##h", "##h", "##h", "08h", "F7h", "04h". Accordingly, the second extracted waveform data obtained will be "06h", "FAh", "01h", "02h", "FCh", "04h".

The extracted waveform data thus obtained is different from the extracted waveform data obtained when no dummy data is added, that is, "08h", "F7h", "04h", "06h", "FAh", "01h", and "02h", "FCh", "04h", "06h", "FAh", ..., and it is also different from the extracted waveform data obtained when (watermark) encoding is performed with watermark information embedded, that is, "##h", "##h", "08h", "F7h", "04h", "06h", and "FAh", "01h", "02h", "FCh", "04h", "06h".

(2) The case where dummy data are added to the top of each extracted waveform data:

When (watermark) encoding is performed with watermark information embedded, if, as shown in FIG. 11A, the entered finite length sample stream is "08h", "F7h", "04h", "06h", "FAh", "01h", "02h", "FCh", "04h", "06h", "FAh", ..., X=2, the number of samples in the extracted waveform is 6, and the value of dummy data is "##h", then the first extracted waveform data obtained will be, as shown in FIG. 11D, "##h", "##", "08h", "F7h", "04h", "06h". Accordingly, the second extracted waveform data obtained will be, as shown in FIG. 11E, "##h", "##h", "FAh", "01h", "02h", "FCh".

Thus, by adding dummy data to the top of each extracted waveform data, data quite different from the extracted waveform data that is obtained with no dummy data added can be obtained.

Therefore, even if difference data is obtained by comparing the bit stream data generated with no watermark information embedded therein with the bit stream data generated with water mark information embedded therein, the obtained difference data contains information other than the watermark information, making it difficult to extract the watermark information. Thus, it is possible to obtain bit stream data that has watermark information more resistant to a malicious attack such as tampering and erasure of the watermark information.

Although in the above described embodiment, a predetermined number of sample data having a fixed value is adopted as dummy data, it is equally possible to use a pseudo-random number to determine the number of sample data of dummy data.

Next, a third embodiment of the present invention will be described.

In the second embodiment described above, as the dummy data a predetermined number of sample data having a fixed value was used. In the third embodiment, interpolated data obtained from the real data of a finite number of sample data are added as dummy data.

Figure 7:
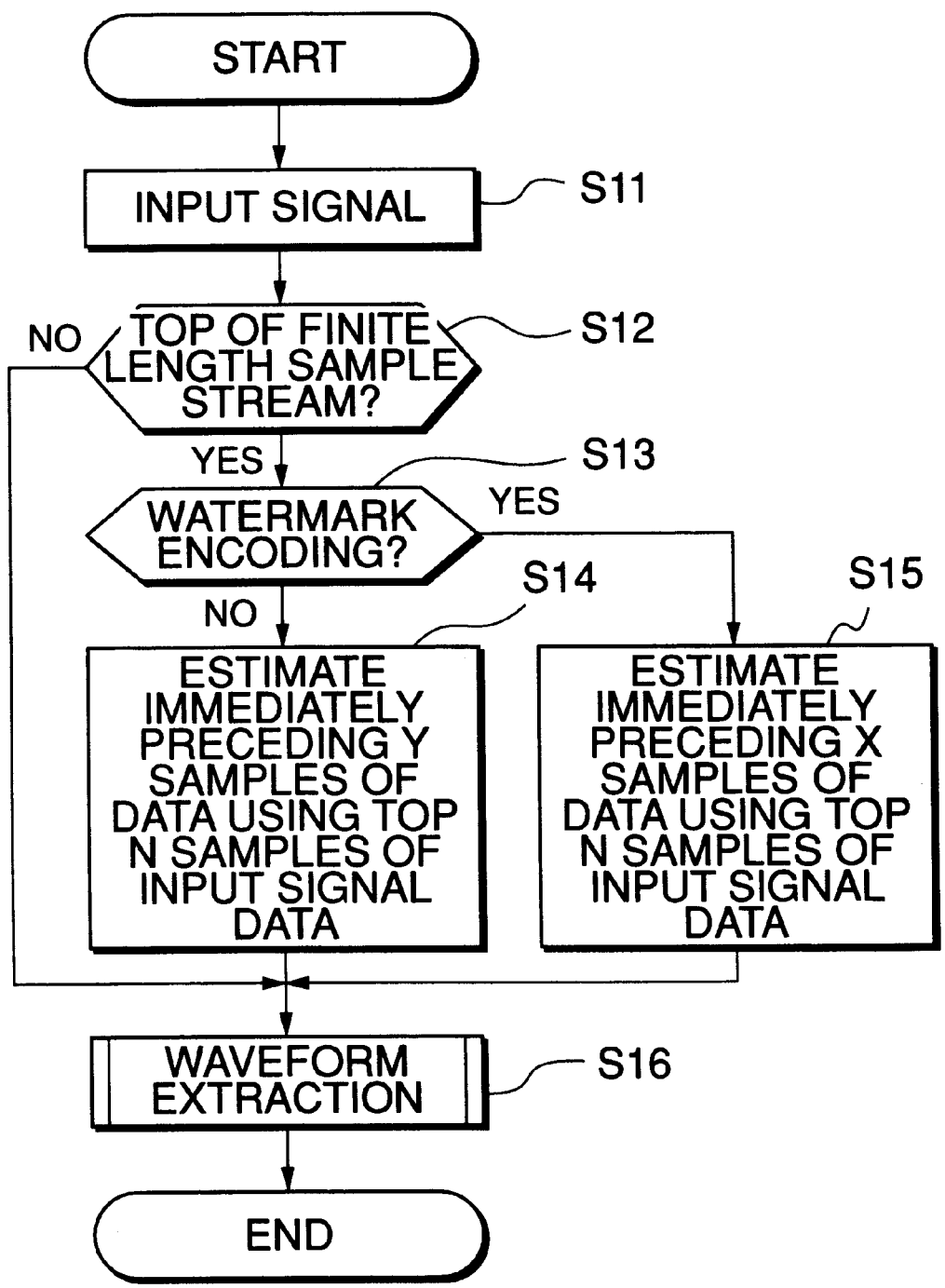
FIG. 7 is a flow chart showing a flow of the operation of a third embodiment of the present invention.

FIG. 7 is a flow chart showing a process preceding and leading to waveform extraction according to the third embodiment.

When input signal data DIN is entered (step S11), it is determined whether the entered input data is at the top of a finite length sample stream or not (step S12), and if it is determined that the entered input data is not at the top of a finite length sample stream (step S12: No), the process proceeds to a step S16.

Here, the input signal data DIN as a whole may be set as one finite length sample stream, or alternatively, the input signal data DIN may be divided into a plurality of divided data and each divided data thus obtained may be set as a finite length sample stream, similarly to the second embodiment.

If it is determined in the step S12 that the entered input data is at the top of a finite length sample stream (step S12: Yes), it is determined whether encoding is to be performed with watermark information embedded or not (step S13).

If it is determined in the step S13 that encoding is to be performed with watermark information embedded (step S13: Yes), N samples of data (N is a natural number not less than 2) as counted from the top of the finite length sample stream are used to estimate X samples of data (X is a natural number) immediately before them by extrapolation, and the X samples of data thus obtained are added as dummy data to the top of the data.

On the other hand, if it is determined in the step S13 that ordinary encoding is to be performed with no watermark information embedded (step S13: No), N samples of data (N is a natural number not less than 2) as counted from the top of the finite length sample stream are used to estimate Y samples of data (Y is a natural number not less than 2, and Y≠X) by extrapolation, and the Y samples of data thus obtained are added as dummy data to the top of the data.

Then, waveform extraction is performed on the data with or without dummy data added (step S16), and the process proceeds to encoding.

Therefore, also in the third embodiment, even if difference data is obtained by comparing the bit stream data generated with no watermark information embedded therein with the bit stream data generated with water mark information embedded therein, the obtained difference data contains information other than the watermark information, making it difficult to extract the watermark information. Thus, it is possible to obtain the bit stream data that has watermark information more resistant to a malicious attack such as tampering and erasure of the watermark information.

Although a predetermined number of sample data are estimated by extrapolation for dummy data in the above described embodiment, it is also possible to determine the number of samples of dummy data using a pseudo-random number.

Figure 8:
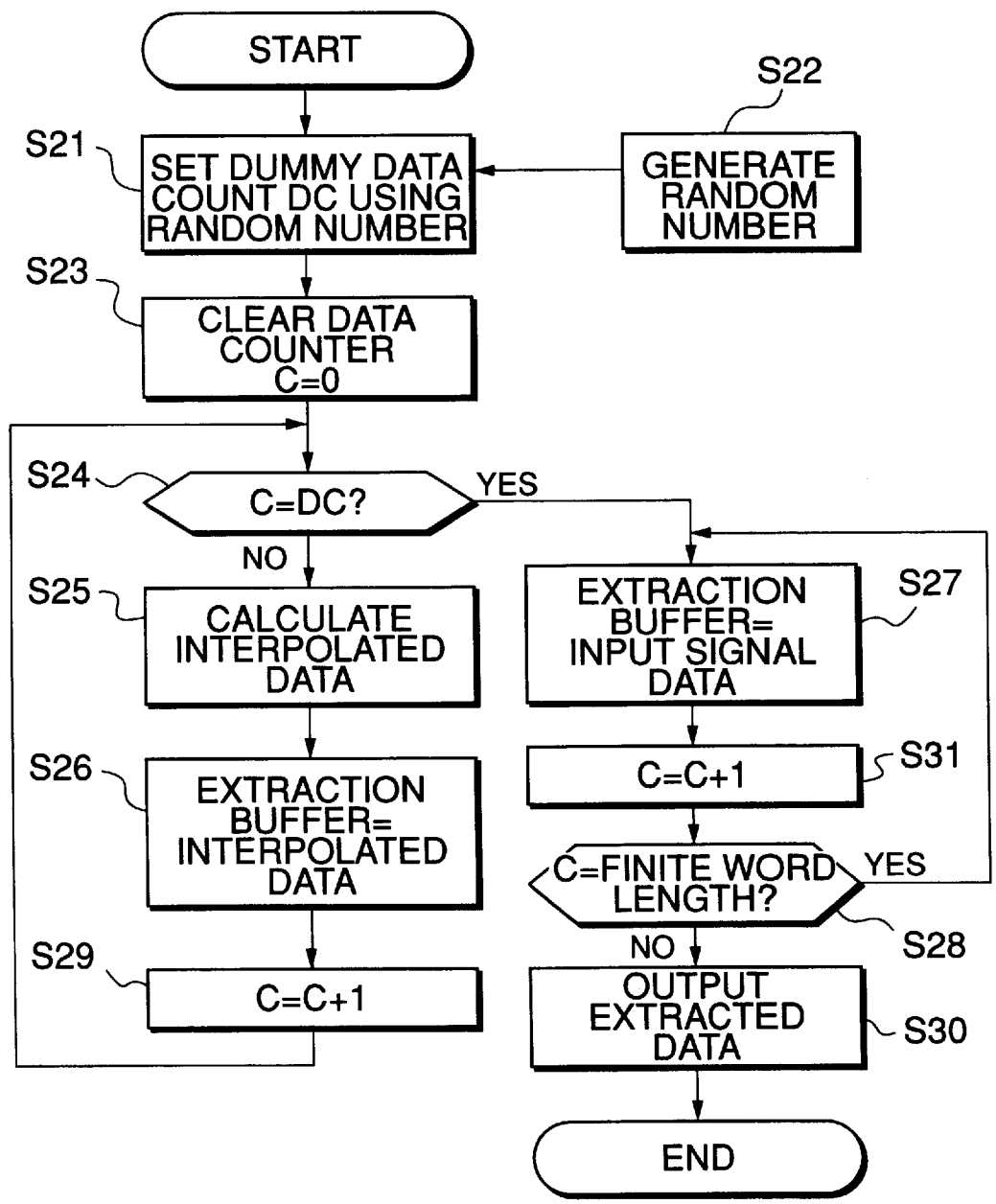
FIG. 8 is a flow chart showing a flow of the operation of a modification of the third embodiment.

This will be explained more in detail with reference to FIG. 8 showing a flow chart of the process.

First, a random number is generated (step S22), and a number of samples of dummy data (dummy data count DC) is set based on the generated random number (step S21).

Then, a data counter C is initialized to C=0 to count the generated dummy data.

Then, it is determined whether the count value of the data counter C is equal to the generated dummy data count or not(step S24).

If in the step S24 the count value of the data counter C is not equal to the generated dummy data count (step S24: No), which means that more dummy data needs to be generated, interpolated data corresponding to one sample data is calculated (step S25). The obtained interpolated data is set to an extraction buffer for waveform extraction (step S26).

Then, the count value of the counter C is incremented by one (step S29), and the process returns to the step S24, and the same process is repeated until the number of obtained interpolated data becomes equal to the generated dummy data count DC.

If it is determined in the step S24 that the count value of the data counter C is equal to the generated dummy data count (step S24: Yes), which means that storing of dummy data into the extraction buffer has been completed, the next one sample data of the input signal data DIN is set to the extraction buffer (step S27), and the count value of the counter C is incremented by one (step S31).

Then, it is determined whether the count value of the counter C is equal to a finite word length that is equal to a predetermined number of sample data of extracted waveform data or not (step S28).

If it is determined in the step S28 that the count value of the counter C is not yet equal to the finite word length corresponding to the predetermined number of sample data of extracted waveform data (step S28: No), the process returns to the step S27 and storing of input signal data in the extraction buffer is repeated in the same manner as above until the number of samples of the data stored in the extraction buffer becomes equal to the finite word length corresponding to the predetermined number of sample data of extracted waveform data.

If it is determined in the step S28 that the count value of the counter C is equal to the predetermined number of sample data of extracted waveform data (step S28: Yes), the extracted waveform data stored in the extraction buffer is output (step S30), and encoding is performed in the same manner as above.

According to this variation, as described above, it is more difficult to extract watermark information, and provides bit stream data with watermark information embedded therein that has watermark information more resistant to a malicious attack such as tampering and erasure of watermark information.

Although in the above described embodiment, dummy data are calculated by extrapolation, it is equally possible to construct the vector quantizer such that dummy data are calculated by interpolation based on the last data of the preceding finite length sample stream and the top data of the current finite length sample stream.

The interpolation method may include any general method of interpolation such as linear interpolation, Lagrange's interpolation, and spline interpolation.

Next, a fourth embodiment of the present invention will be described.

While in the above described embodiments a vector quantizer having a basic construction has been used as the vector quantizer according to the present invention, a multistage vector quantizer is used for vector quantization in the fourth embodiment.

Figure 9:
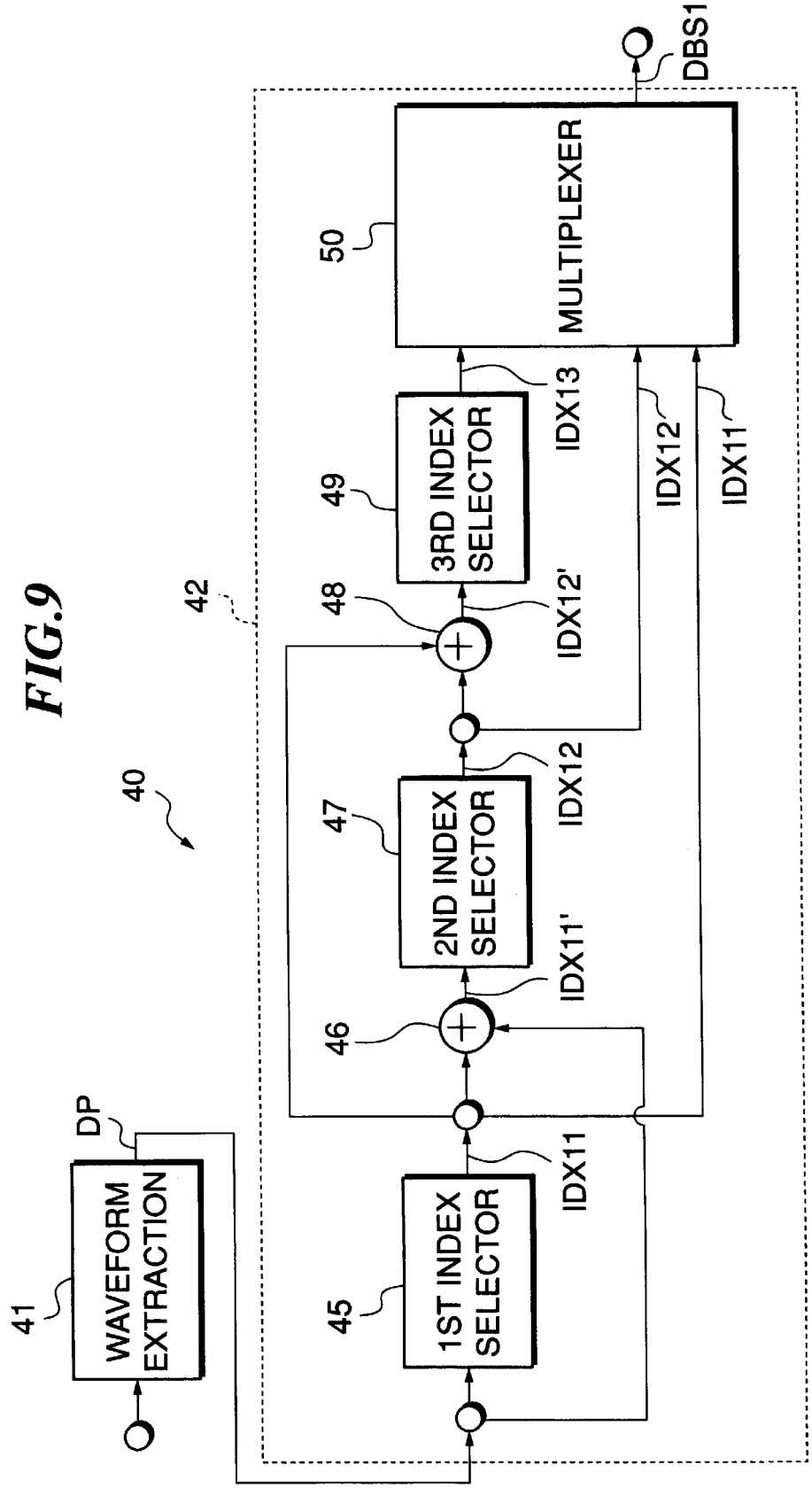
FIG. 9 is a block diagram showing in detail the construction of a multiple stage vector quantizer according to a fourth embodiment of the present invention.

FIG. 9 is a block diagram showing the construction of a multistage vector quantizer according to the fourth embodiment.

The multistage vector quantizer 40 is comprised of a waveform extracting device 41 that performs waveform extraction on input signal data DIN and outputs the extracted waveform data DP, and an index generating device 42 that generates indexes based on the extracted waveform data DP and outputs bit stream data DBS1.

The index generating device 42 is comprised of a first index selector 45 that outputs first index data DIDX11 based on the extracted waveform data DP, a first adder 46 that adds the extracted waveform data DP and the first index data DIDX11 and outputs first added index data DIDX11', a second index selector 47 that outputs second index data DIDX12 based on the first added index data DIDX11', a second adder 48 that adds the first index data DIDX11 and the second index data DIDX12 and outputs second added index data DIDX12', a third index selector 49 that outputs third index data DIDX13 based on the second added index data DIDX12', and a multiplexer 50 that generates and outputs bit stream data DBS1 from the first index data DIDX11, the second index data DIDX12 and the third index data DIDX13 by a time sharing method or the like.

The first index selector 45, the second index selector 47 and the third index selector 49 in this embodiment have the same functions as the embedding position information memory 21, the random number generator 22, the watermark information memory 23, the code book 24, the first encoder 25, the second encoder 26 and the selector 27 in the first embodiment.

Next, the operation of the multistage vector quantizer according to the fourth embodiment will be described.

The waveform extracting device 41 of the multistage vector quantizer 40 performs waveform extraction on the input signal data DIN and outputs the extracted waveform data DP to the first index selector 45 and the first adder 46 of the index generating device 42.

The first index selector 45 of the index generating device 42 performs index generation based on the extracted waveform data DP and outputs the first index data DIDX11 to the first adder 46, the second adder 48 and the multiplexer 50.

Here, the first index selector 45 randomly selects the first index data DIDX11 corresponding to the non-embedding position of watermark information based on a random number, from among a plurality of candidate indexes that have amounts of errors falling within a predetermined range, in addition to the first candidate index having the least error, thereby providing the same effect as in the first embodiment.

The first adder 46 adds the extracted waveform data DP and the first index data DIDX11, and outputs the first added index data DIDX1' to the second index selector 47.

The second index selector 47 generates the second index data DIDX12 based on the first added index data DIDX11' and outputs the same to the second adder 48 and the multiplexer 50.

Here again, the second index selector 47 randomly selects, in the same manner as in the first index selector 45, the second index data DIDX12 corresponding to the non-embedding position of watermark information based on a random number, from among a plurality of candidate indexes that have amounts of errors falling within a predetermined range, in addition to the first candidate index having the least error.

The second adder 48 adds the first index data DIDX11 and the second index data DIDX12 and outputs the second added index data DIDX12' to the third index selector 49 and the multiplexer 50.

The third index selector 49 outputs the third index data DIDX13 based on the second added index data DIDX12' to the multiplexer 50.

Here again, the third index selector 49 randomly selects, in the same manner as in the first index selector 45 or the second index selector 47, the third index data DIDX13 corresponding to the non-embedding position of watermark information based on a random number, from among a plurality of candidate indexes that have amounts of errors falling within a predetermined range, including but not limited to the first candidate index having the least error.

The multiplexer 50 generates bit stream data DBS1 from the first index data DIDX11, the second index data DIDX12 and the third index data DIDX13 by a time sharing method or the like. The first index selector 45, the second index selector 47 and the third index selector 49 randomly select index data corresponding to the non-embedding position of watermark information based on a random number, from among a plurality of candidate indexes that have amounts of errors falling within a predetermined range, in addition to the first candidate index having the least error. Thus, even if difference data is obtained by comparing the bit stream data generated with no watermark information embedded therein with the bit stream data generated with water mark information embedded therein, the obtained difference data contains information other than the watermark information in a complicated manner, making it difficult to extract the watermark information, so that it is possible to obtain the bit stream data that has watermark information more resistant to a malicious attack such as tampering and erasure of the watermark information.

In the above described embodiment, index data is randomly selected as in the first embodiment. It is equally possible to realize the same processing operation as in the second and third embodiments with a multistage vector quantizer.

A fifth embodiment of the present invention will next be explained.

In the fifth embodiment, a conjugate vector quantizer is used for vector quantization.

Figure 10:
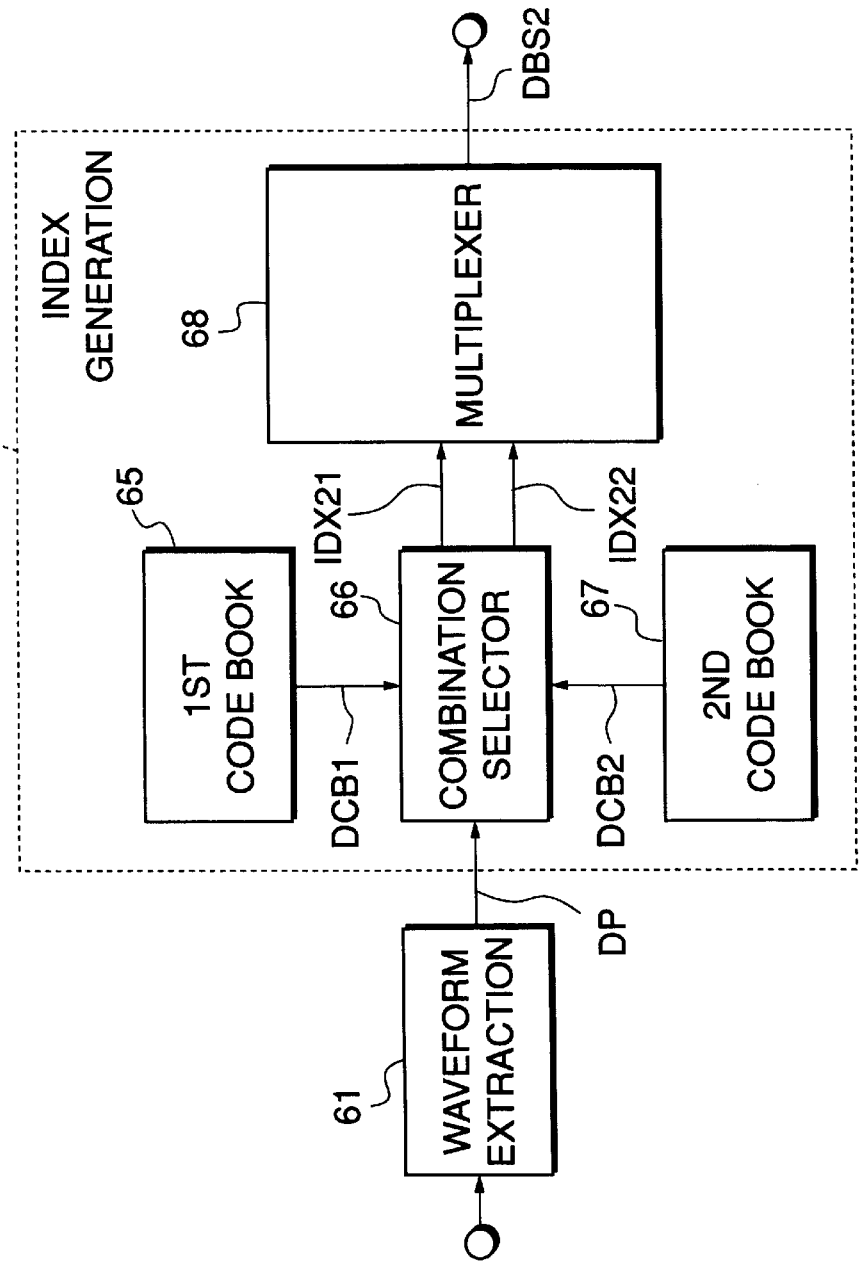
FIG. 10 is a block diagram showing in detail the construction of a conjugate vector quantizer according to a fifth embodiment of the present invention.

FIG. 10 is a block diagram showing the construction of a conjugate vector quantizer according to the fifth embodiment.

The conjugate vector quantizer 60 is comprised of a waveform extracting device 61 that performs waveform extraction on input signal data DIN and outputs the extracted waveform data DP, and an index generating device 62 that generates indexes based on the extracted waveform data DP and outputs bit stream data DBS2.

The index generating device 62 is comprised of a first code book 65 storing first index data DCB1 having a first system, a second code book 66 storing second index data DCB2 having a second system different from the first system, a combination selector 66 that randomly selects one combination based on a random number from among a plurality of combinations of the first index data DCB1 and the second index data DCB2 corresponding to the same extracted waveform data DP that have amounts of errors falling within a predetermined range and outputs the first index data DCB1 and the second index data DCB2 corresponding to the selected combination as first selected index data DIDX21 and second selected index data DIDX22, and a multiplexer 68 that generates and outputs bit stream data DBS2 based on the first selected index data DIDX21 and the second selected index data DIDX22 by a time sharing method or the like.

The operation of the conjugate vector quantizer according to the fifth embodiment will be described hereinbelow.

The waveform extracting device 61 of the conjugate vector quantizer 60 performs waveform extraction on the input signal data DIN, and outputs the extracted waveform data DP to the index generating device 62.

The combination selector 66 of the index generating device 62 randomly selects one combination based on a random number from among a plurality of combinations of the first index data DCB1 and the second index data DCB2 corresponding to the same extracted waveform data DP that have amounts of errors falling within a predetermined range, and outputs the the first index data DCB1 and the second index data DCB2 corresponding to the selected combination as the first selected index data DIDX21 and second selected index data DIDX22 to the multiplexer 68.

The multiplexer 68 generates and outputs the bit stream data DBS2 based on the first selected index data DIDX21 and the second selected index data DIDX22 by a time sharing method or the like.

As described above, the conjugate vector quantizer is constructed such that one combination is randomly selected based on a random number, from among a plurality of combinations of the first index data DCB1 and the second index data DCB2 corresponding to the same extracted waveform data DP that have amounts of errors falling within a predetermined range. Even if difference data is obtained by comparing the bit stream data generated with no watermark information embedded therein with the bit stream data generated with watermark information embedded therein, the obtained difference data contains information other than the watermark information, making it difficult to extract the watermark information. Thus, it is possible to obtain the bit stream data that has watermark information more resistant to a malicious attack such as tampering or erasure of the watermark information.

In the above described embodiment, in selecting the combination of the first index data DCB1 and the second index data DCB2 corresponding to the extracted waveform data DP, selection is performed randomly using a random number. The extraction of watermark information can be made more difficult also by adding dummy data in obtaining the extracted waveform data DP, as in the second and third embodiments.

According to the first to fifth embodiments described above, even if difference data is obtained by comparing bit stream data generated with no watermark information embedded therein with bit stream data generated with watermark information embedded therein, the difference data contains information other than the watermark information in a complicatedly entangled manner, so that it is difficult to extract the watermark information from the difference data. Thus, it is possible to obtain bit stream data having watermark information more resistant to malicious attack such as tampering and erasure of the watermark information, and thus unfair use of the vector quantized information can be accurately found out.

A sixth embodiment of the present invention will next be described.

Figure 12:
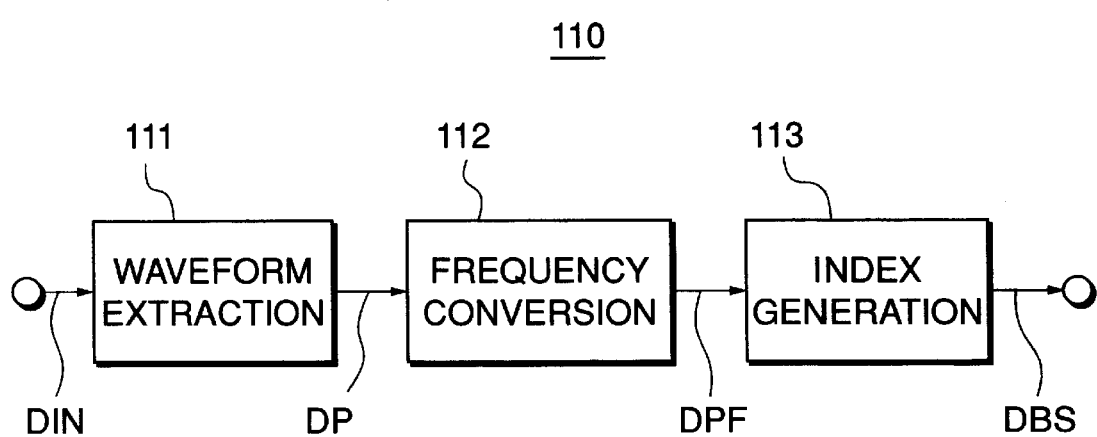
FIG. 12 is a block diagram schematically showing the construction of a vector quantizer according to a sixth embodiment of the present invention.

FIG. 12 is a block diagram schematically showing the construction of a vector quantizer according to the sixth embodiment.

The vector quantizer 110 is comprised of a waveform extracting device 111 that performs waveform extraction on input signal data DIN and outputs the extracted waveform data DP, a frequency converter 112 that performs time axis/frequency axis conversion on the extracted waveform data DP and outputs frequency axis extracted waveform data DPF, and an index generating device 113 that generates an index based on the frequency axis extracted waveform data DPF and outputs bit stream data DBS.

FIG. 13 is a block diagram showing in detail the construction of the index generating device 113 in FIG. 12. Here, the index generating device 113 divides the frequency axis extracted waveform data DPF into six frequency bands (referred to, from low frequency side to high frequency side, as L1, L2, M1, M2, H1, and H2) and performs the processing operation on the divided data.

In the case of the sampling frequency of 44.1 kHz by way of example, the boundary between L2 band and M1 band is set at about 7 kHz, and that between M2 band and H1 band is set at about 14 kHz. It is to be understood that this is only an example, and any modification can be made as required depending on human sensory characteristics or design concepts.

The index generating device 113 is comprised of a first low frequency band vector quantizing part 115 that performs vector quantization on frequency axis extracted waveform data DPFL1 which is components of the frequency axis extracted waveform data DPF contained in the lowest frequency band L1 and outputs first low frequency band index data DPIDL1, a second low frequency band vector quantizing part 116 that performs vector quantization on frequency axis extracted waveform data DPFL2 which is components of the frequency axis extracted waveform data DPF contained in the frequency band L2 and outputs second low frequency band index data DPIDL2, a first intermediate frequency band vector quantizing part 117 that performs vector quantization on frequency axis extracted waveform data DPFM1 which is components of the frequency axis extracted waveform data DPF contained in the frequency band M1 and outputs first intermediate frequency band index data DPIDM1, a second intermediate frequency band vector quantizing part 118 that performs vector quantization on frequency axis extracted waveform data DPFM2 which is components of the frequency axis extracted waveform data DPF contained in the frequency band M2 and outputs second intermediate frequency band index data DPIDM2, a first high frequency band vector quantizing part 119 that performs vector quantization on frequency axis extracted waveform data DPFH1 which is components of the frequency axis extracted waveform data DPF contained in the frequency band H1 (for example, 10 kHz and above) and outputs first high frequency band index data DPIDH1, and a second high frequency band vector quantizing part 120 that performs vector quantization on frequency axis extracted waveform data DPFH2 which is components of the frequency axis extracted waveform data DPF contained in the highest frequency band H2 and outputs second high frequency band index data DPIDH2.

The index generating device 113 is further comprised of an embedding position information memory 121 that stores watermark information embedding position data DFP, a random number generator 122 that generates random number data DRN, a watermark information memory 123 that stores watermark information data DWM in advance, a watermark embedding part 124 that adds watermark information data DWM to the entered first high frequency band index data DPIDH1 to output first watermark added high frequency band index data DPWM1, or adds watermark information data DWM to the entered second high frequency band index data DPIDH2 to output second watermark added high frequency band index data DPWM2, a vector quantizing part selector 125 that performs vector quantizing part selecting operation to connect either the first high frequency band vector quantizing part 119 or the second high frequency band vector quantizing part 120 to the watermark embedding part 124 and outputs either the first watermark added high frequency band index data DPWM1 or the second watermark added high frequency band index data DPWM2 to a multiplexer 128 to be described later, and outputs the selection data DSEL, switches 126-1, 126-2, 127-1, 127-2 that are turned on/off under the control of the vector quantizing part selector 125, and a multiplexer 128 that generates and outputs bit stream data DBS based on the first low frequency band index data DPIDL1, the second low frequency band index data DPIDL2, the first intermediate frequency band index data DPIDM1, the second intermediate frequency band index data DPIDM2, the first high frequency band index data DPIDH1, the second high frequency band index data DPIDH2, the first watermark added high frequency band index data DPWM1, and the second watermark added high frequency band index data DPWM2.

The operation of the vector quantizer according to the sixth embodiment will be described.

The waveform extracting device 111 performs waveform extraction on the input signal data DIN and outputs the extracted waveform data DP to the frequency converter 112.

The frequency converter 112 performs time axis/frequency axis conversion on the extracted waveform data DP and outputs the frequency axis extracted waveform data DPF to the index generating device 113.

Then, the first low frequency band vector quantizing part 115 performs vector quantization on the frequency axis extracted waveform data DPFL1 which is components of the frequency axis extracted waveform data DPF contained in the frequency band L1, and outputs the first low frequency band index data DPIDL1 to the multiplexer 128.

In the same way, the second low frequency band vector quantizing part 116 performs vector quantization on the frequency axis extracted waveform data DPFL2 which is components of the frequency axis extracted waveform data DPF contained in the frequency band L2, and outputs the second low frequency band index data DPIDL2 to the multiplexer 128, the first intermediate frequency band vector quantizing part 117 performs vector quantization on the frequency axis extracted waveform data DPFM1 which is components of the frequency axis extracted waveform data DPF contained in the frequency band M1, and outputs the first intermediate frequency band index data DPIDM1 to the multiplexer 128, the second intermediate frequency band vector quantizing part 118 performs vector quantization on the frequency axis extracted waveform data DPFM2 which is components of the frequency axis extracted waveform data DPF contained in the frequency band M2, and outputs the second intermediate frequency band index data DPIDM2 to the multiplexer 128, the first high frequency band vector quantizing part 119 performs vector quantization on the frequency axis extracted waveform data DPFH1 which is components of the frequency axis extracted waveform data DPF contained in the frequency band H1, and outputs the first high frequency band index data DPIDH1 to the switch 126-1, and the second high frequency band vector quantizing part 120 performs vector quantization on the frequency axis extracted waveform data DPFH2 which is components of the frequency axis extracted waveform data DPF contained in the frequency band H2, and outputs the second high frequency band index data DPIDH2 to the switch 126-2.

Figure 14A:
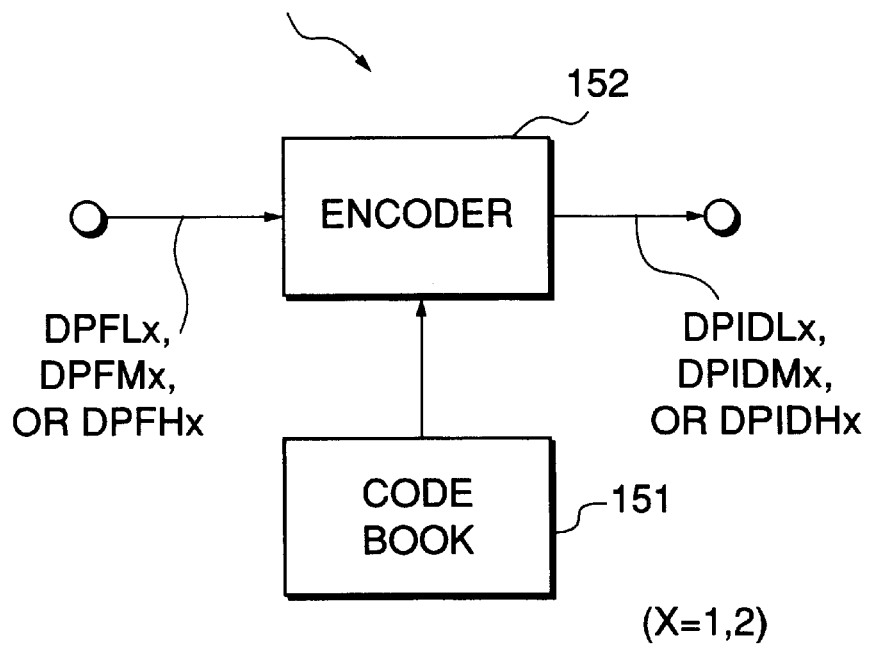
FIG. 14 is a block diagram schematically showing the construction of an encoder and a decoder.

Now, description will be made of the constructions of the first low frequency band vector quantizing part 115, the second low frequency band vector quantizing part 116, the first intermediate frequency band vector quantizing part 117, the second intermediate frequency band vector quantizing part 118, the first high frequency band vector quantizing part 119, and the second high frequency band vector quantizing part 120, with reference to FIG. 14A, taking the first low frequency band vector quantizing part 115 as an example.

The first low frequency band vector quantizing part 115 is comprised of a code book 151 that stores the first low frequency band index data DPIDL1, and an encoder 152 that encodes the entered frequency axis extracted waveform data DPFL1 based on the stored contents of the code book 151.

On the other hand, the embedding position information memory 121 outputs the stored watermark information embedding position data DFP to the watermark embedding part 124, the random number generator 122 generates the random number data DRN for randomly selecting the embedding position of watermark information and outputs it to the watermark embedding part 124, and the watermark information memory 123 successively outputs the stored watermark information data DWM successively to the watermark embedding part 124.

The watermark embedding part 124 determines the embedding position based on the embedding position data DFP and the random number data DRN, and adds the watermark information data DWM to the entered first high frequency band index data DPIDH1 and outputs the first watermark added high frequency band index data DPWM1 via the switch 127-1 to the multiplexer 128, or adds the watermark information data DWM to the entered second high frequency band index data DPIDH2 and outputs the second watermark added high frequency band index data DPWM2 via the switch 127-2 to the multiplexer 128.

Consequently, the multiplexer 128 generates the bit stream data DBS based on the first low frequency band index data DIDL1, the second low frequency band index data DIDL2, the first intermediate frequency band index data DIDM1, the second intermediate frequency band index data DIDM2, the first high frequency band index data DIDH1, the second high frequency band index data DIDH2, the first watermark added high frequency band index data DPWM1, and the second watermark added high frequency band index data DPWM2, and the bit stream data DBS is transmitted via a transmission path not shown.

The structure of the bit stream data DBS is the same as shown in FIG. 3A, description of which is therefore omitted.

Next, a vector decoder which is applicable to the sixth embodiment will be explained.

FIG. 15 is a block diagram schematically showing the construction of the vector decoder.

The vector decoder 130 is comprised of a decoding part 131 that decodes the entered bit stream data DBS (see FIG. 3A) by a decoding method corresponding to the encoding method indicated by the encoding method data DEM or by a predetermined decoding method and outputs frequency axis extracted waveform data DPFL1, DPFL2, DPFM1, DPFM2, DPFH1, and DPFH2, a time axis converter 132 that performs frequency axis/time axis conversion on the frequency axis extracted waveform data DPFL1, DPFL2, DPFM1, DPFM2, DPFH1, and DPFH2 and outputs time axis extracted waveform data DPT, a frame generating part 33 that generates frames based on the time axis extracted waveform data DPT and outputs the output signal data DOUT, and a watermark information decoding part 134 that outputs the output watermark information data DWMOUT based on the watermark position information data DWMP (=any of the watermark position information data DWMP1–DWMPm in the bit stream data DBS, or watermark position information data entered from an external watermark information database, not shown).

The decoding part 131 is comprised of a demultiplexer 135 that separates the bit stream data DBS and outputs the first low frequency band index data DPIDL1, the second low frequency band index data DPIDL2, the first intermediate frequency band index data DPIDM1, the second intermediate frequency band index data DPIDM2, the first high frequency band index data DPIDH1, the second high frequency band index data DPIDH2, and the first watermark added high frequency band index data DPWM1 in place of the first high frequency band index data DPIDH1, or the second watermark added high frequency band index data DPWM2 in place of the second high frequency band index data DPIDH2, a first low frequency band vector decoding part 136 that decodes the first low frequency band index data DPIDL1 and outputs the frequency axis extracted waveform data DPFL1, a second low frequency band vector decoding part 137 that decodes the second low frequency band index data DPIDL2 and outputs the frequency axis extracted waveform data DPFL2, a first intermediate frequency band vector decoding part 138 that decodes the first intermediate frequency band index data DPIDM1 and outputs the frequency axis extracted waveform data DPFM1, a second intermediate frequency band vector decoding part 139 that decodes the second intermediate frequency band index data DPIDM2 and outputs the frequency axis extracted waveform data DPFM2, a first high frequency band vector decoding part 140 that decodes the first high frequency band index data DPIDH1 or the first watermark added high frequency band index data DPWM1 and outputs the frequency axis extracted waveform data DPFH1, and a second high frequency band vector decoding part 141 that decodes the second high frequency band index data DPIDH2 or the second watermark added high frequency band index data DPWM2 and outputs the frequency axis extracted waveform data DPFH2.

Figure 14B:
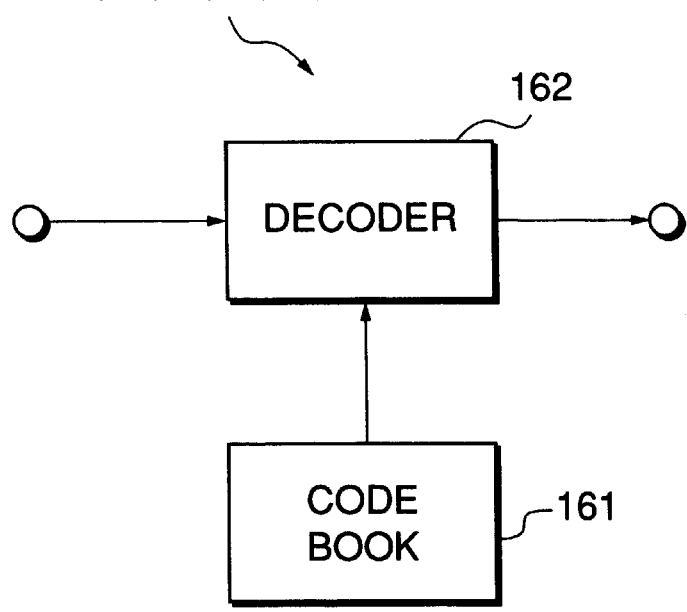

Now, description will be made of the constructions of the first low frequency band decoding part 136, the second low frequency band decoding part 137, the first intermediate frequency band decoding part 138, the second intermediate frequency band decoding part 139, the first high frequency band decoding part 140, and the second high frequency band decoding part 141, with reference to FIG. 14B, taking the first low frequency band decoding part 136 as an example.

The first low frequency band decoding part 136 is comprised of a code book 161 that stores the frequency axis extracted waveform data DPFL1, and a decoder 152 that decodes the entered first low frequency band index data DPIDL1 based on the stored contents of the code book 161.

The watermark information decoder 134 need not be included in a decoder for general users or the like where the watermark information is not necessarily required.

The structure of bit stream data DBS' which is applied in the case where the watermark position information data is entered from the external watermark position information database is the same as shown in FIG. 3B, description of which is therefore omitted.

Next, the operation of the vector decoder 130 constructed as above will be described.

The demultiplexer 135 of the vector decoder 131 separates the bit stream data DBS and outputs the first low frequency band index data DPIDL1, the second low frequency band index data DPIDL2, the first intermediate frequency band index data DPIDM1, the second intermediate frequency band index data DPIDM2, the first high frequency band index data DPIDH1, the second high frequency band index data DPIDH2, and the first watermark added high frequency band index data DPWM1 in place of the first high frequency band index data DPIDH1, or the second watermark added high frequency band index data DPWM2 in place of the second high frequency band index data DPIDH2, to the respective corresponding vector decoding parts 136–141.

The first low frequency band decoding part 136 decodes the first low frequency band index data DPIDL1 and outputs the frequency axis extracted waveform data DPFL1 to the time axis converter 132.

In the same manner, the second low frequency band decoding part 137 decodes the second low frequency band index data DPIDL2 and outputs the frequency axis extracted waveform data DPFL2 to the time axis converter 132, the first intermediate frequency band decoding part 138 decodes the first intermediate frequency band index data DPIDM1 and outputs the frequency axis extracted waveform data DPFM1 to the time axis converter 132, the second intermediate frequency band decoding part 139 decodes the second intermediate frequency band index data DPIDM2 and outputs the frequency axis extracted waveform data DPFM2 to the time axis converter 132, the first high frequency band decoding part 140 decodes the first high frequency band index data DPIDH1 or the first watermark added high frequency band index data DPWM1 and outputs the frequency axis extracted waveform data DPFH1 to the time axis converter 132, and the second high frequency band decoding part 141 decodes the second high frequency band index data DPIDH2 or the second watermark added high frequency band index data DPWM2 and outputs the frequency axis extracted waveform data DPFH2 to the time axis converter 132.

The time axis converter 132 performs frequency axis/time axis conversion on the frequency axis extracted waveform data DPFL1, DPFL2, DPFM1, DPFM2, DPFH1, DPFH2 and outputs the time axis extracted waveform data DPT to the frame generator 133.

The frame generator 133 performs frame generation based on the time axis extracted waveform data DPT and outputs the output signal data DOUT.

Thus, a user can reproduce an image, voice or the like corresponding to the output signal data DOUT.

On the other hand, the watermark information decoder 134 outputs the output watermark information data DWMOUT based on the watermark position information data DWMP(=any of the watermark position information data DWMP1–DWMPm in the bit stream data DBS, or watermark position information data entered from an external watermark position information database).

If copyright information or the like is included as the output watermark information data DWMOUT, the source or the like of the output signal data DOUT in question can be easily identified.

As described above, according to the sixth embodiment, the watermark information data is embedded in the high frequency band index data. As a result, especially in the case where the input signal data is an audio signal such as a voice or sound signal, the watermark information data is embedded in those frequency bands which have little influence upon human auditory sensation, so that the effect of the watermark information is hardly sensible to the listeners ears, thus avoiding substantial degradation of the sound quality due to the embedding of the watermark.

In the above described embodiment, each vector quantizing part has the most basic construction for performing vector quantization. However, it may be modified such that in selecting index data corresponding to the non-embedding position of the watermark information, the index data is randomly selected based on a random number from among a plurality of candidate indexes that have amounts of errors falling within a predetermined range, in addition to the first candidate index having the least error. Then, even if difference data is obtained by comparing the bit stream data generated with no watermark information embedded therein with the bit stream data generated with watermark information embedded therein, the difference data contains information other than the watermark information, making it difficult to extract the watermark information. Thus, it is possible to obtain the bit stream data that has watermark information more resistant to a malicious attack such as tampering and erasure of the watermark information.

Although in the above described modification, only the case where watermark information is embedded is illustrated, the situation is the same with the case where watermark information is not embedded at all. The quantizing part for the high frequency band may be constructed such that the selection of the index information is performed randomly using a random number from among a plurality of indexes that have amounts of errors falling within a predetermined range, in addition to the first candidate index having the least error. Then, even if a malicious attacker obtains difference data by comparing the bit stream data generated with no watermark information embedded therein with the bit stream data generated with watermark information embedded therein, the difference data contains information other than the watermark information, making it difficult to extract the watermark information. Thus, it is possible to obtain the bit stream data that has watermark information more resistant to a malicious attack such as tampering and erasure of the watermark information.

Figure 16:
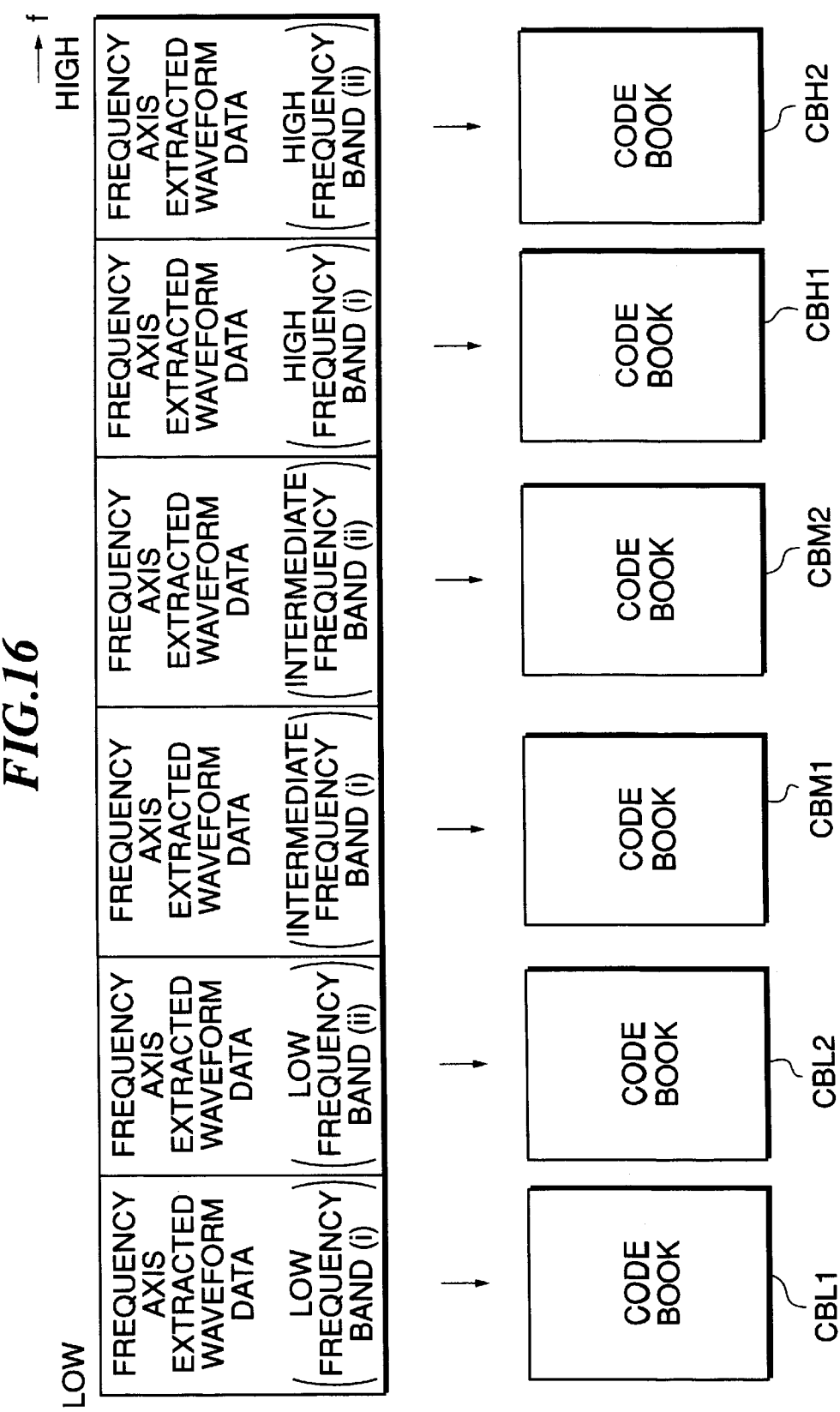
FIG. 16 is a view useful in explaining the operation of the sixth embodiment of the present invention.
Figure 17A:
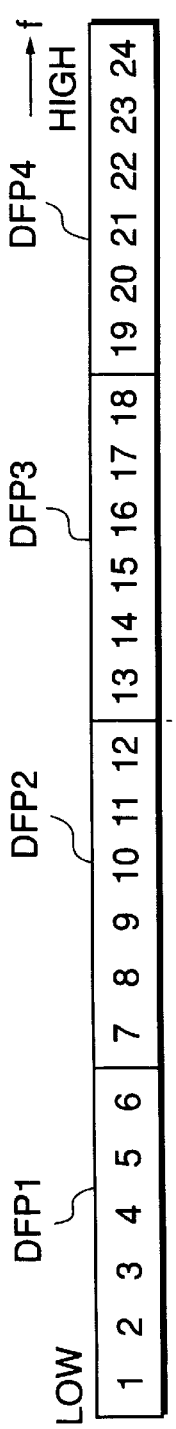
FIG. 17 is a view useful explaining the operation of a seventh embodiment of the present invention.
Figure 17B:
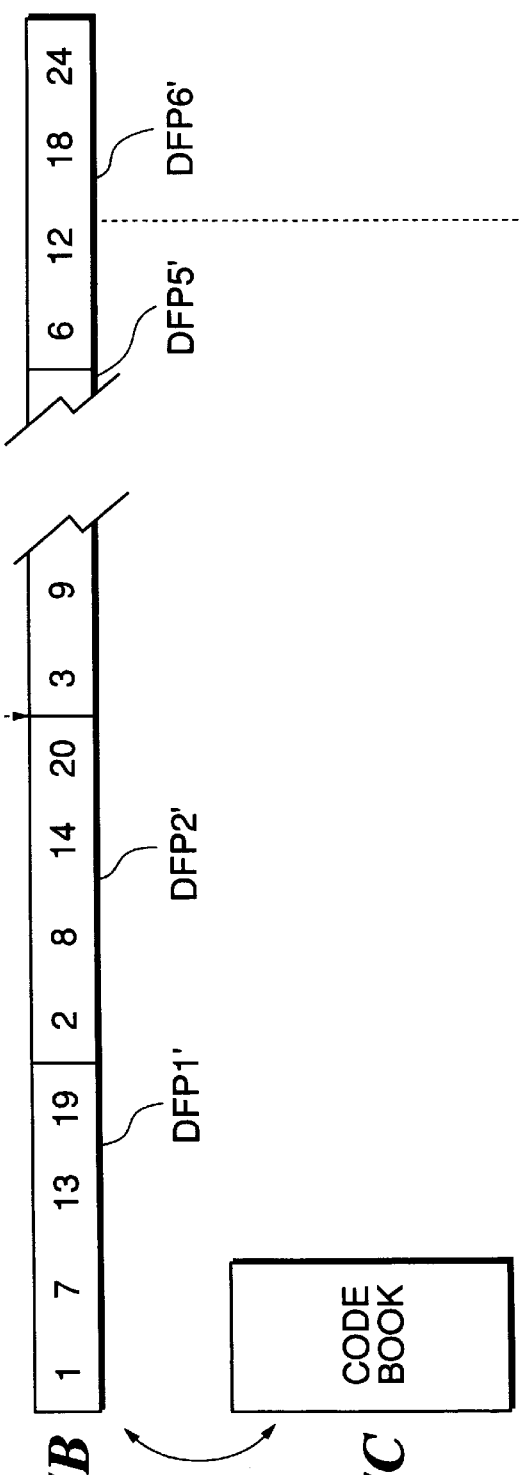
Figure 17C:
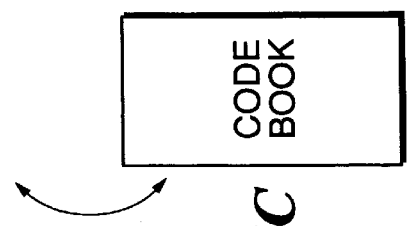
Figure 17D:
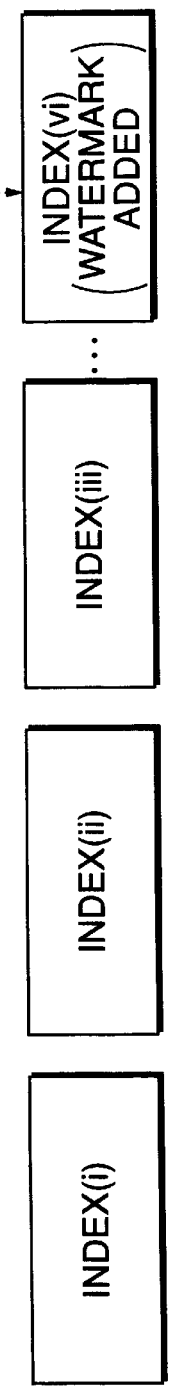

Although the above described modification is directed to the selection of the index data corresponding to the non-embedding position of the watermark information, it is equally possible to construct the vector quantizer in such a way that as shown in FIG. 16, in performing vector quantization on the frequency axis extracted waveform data in the highest frequency band using a code book CBH2, the selection of the index data is performed randomly using a random number from among a plurality of indexes that have amounts of errors falling within a predetermined range, in addition to the first candidate index having the least error.

It is also possible to select one or more code books from a plurality of code books corresponding to high frequency bands (in FIG. 16, code books CBH1, CBH2), and construct the vector quantizer in such a way that only for the code book(s) selected, selection of index data is performed randomly using a random number or the like, as in the above described modification, and for code books not selected, the first candidate index data having the least error is selected.

Next, a seventh embodiment of the present invention will be described.

FIG. 17 is a view useful explaining the operation of a vector quantizer according to the seventh embodiment.

In the above described sixth embodiment, no processing operation is performed on the frequency axis extracted waveform data DPF. In the seventh embodiment, when frequency axis extracted waveform data DPF1–DPF4 as shown in FIG. 17 are obtained (in the figure, numbers 1–24 refer to subdivisions of the frequency bands), the obtained frequency axis extracted waveform data DPF1–DPF4 are interleaved, and among the interleaved frequency axis extracted waveform data DPF1'–DPF6' obtained, watermark information data is added to the interleaved frequency axis extracted waveform data DPF6' that contains the largest amount of high frequency band components to obtain index data (vi) (see FIG. 17).

Thus, even when the extracted waveform data are interleaved, watermark information is added to the index data containing high frequency components which are less susceptible to the effect of watermark information. In this manner, especially in the case of input signal data corresponding to an audio signal such as a voice or sound signal, watermark information data is embedded in a frequency band which has little influence upon human auditory sensation, so that the effect of the watermark information is hardly sensible to the listeners ears, thus avoiding substantial degradation of the sound quality due to the embedding of the watermark.

Although in the sixth embodiment described above, the most basic form of vector quantizer is assumed for vector quantization, the present invention is also applicable to a multistage vector quantizer that performs vector quantization in multiple stages, as well as to a conjugate vector quantizer that performs vector quantization using a combination of a plurality of index data.

Although audio data are mainly used as an example of input signal data in the above described embodiments, the same effects as described above can be obtained for other types of input signal data insofar as the vector quantizer is constructed such that the watermark information is embedded in the frequency band where the embedding of the watermark information is not easily perceived, based not only on human auditory sensation, but on other human sensory characteristics such as visual sensation.

According to the sixth and seventh embodiments, watermark information is embedded in a frequency band where embedding of the watermark information is not easily perceived, according to human sensory characteristics, so that a user cannot easily find out degradation of the reproduced signal due to the addition of watermark information.

Since watermark information is embedded randomly, or information other than watermark information is also embedded, the embedding position of watermark information cannot be easily identified, and thus unfair use of the vector quantized information can be accurately found out.

What is claimed is:

1. A vector quantizer for performing vector quantization on input signal data, comprising:
   a waveform extracting device that performs waveform extraction on said input signal data to output extracted waveform data; and
   an index generating device that generates index data based on the output extracted waveform data;
   wherein as index data to be generated based on predetermined extracted waveform data in which no watermark information is to be embedded, out of the output extracted waveform data, said index generating device randomly selects index data corresponding to the predetermined extracted waveform data from a plurality of index data which, when decoded, have amounts of errors falling within a predetermined range with respect to the predetermined extracted waveform data before decoding.

2. A vector quantizer for performing conjugate structure vector quantization on input signal data, comprising:
   a waveform extracting device that performs waveform extraction on said input signal data to output extracted waveform data; and
   an index generating device that generates index data based on the output extracted waveform data;
   wherein as a combination of index data to be generated based on predetermined extracted waveform data in which no watermark information is to be embedded, out of the output extracted waveform data, said index generating device randomly selects a combination of index data corresponding to the predetermined extracted waveform data from a plurality of combinations of index data which, when decoded, have amounts of errors falling within a predetermined range with respect to the predetermined extracted waveform data before decoding.

3. A vector quantizer as claimed in claim 1, comprising a first vector quantizing device to an n-th vector quantizing device (n is an integer not less than 2) for performing multistage vector quantization.

4. A vector quantizer as claimed in claim 3, wherein at least one of said first vector quantizing device to said n-th vector quantizing device includes a dummy data adding device for adding dummy data to a portion of said extracted waveform data when generating said extracted waveform data.

5. A vector quantizer as claimed in claim 1, further comprising a dummy data adding device that adds dummy data to a portion of said extracted waveform data when generating said extracted waveform data.

6. A vector quantizer as claimed in claim 5, wherein said extracted waveform data is formed of a predetermined finite number of sample data, and wherein said dummy data adding device divides said input signal data into a plurality of divided data each formed of a predetermined number of sample data smaller than said predetermined finite number of sample data, said dummy data adding device adding said dummy data to each of said plurality of divided data to thereby generate said extracted waveform data formed of said predetermined finite number of sample data.

7. A vector quantizer as claimed in claim 6, wherein a number of said sample data of said dummy data is different between when said divided data has watermark information embedded therein and when said divided data has no watermark information embedded therein.

8. A vector quantizer as claimed in claim 6, wherein said dummy data adding device repeatedly adds said dummy data formed of a predetermined fixed number of sample data to said divided data until said divided data becomes formed of sample data equal in number to said predetermined finite number.

9. A vector quantizer as claimed in claim 6, wherein said dummy data adding device adds, as said dummy data, calculated data obtained by performing a predetermined operation based on said divided data and formed of a number of sample data being equal to a difference between a number of sample data of said extracted waveform data and a number of sample data of said divided data.

10. A vector quantizer as claimed in claim 9, wherein said calculated data is calculated by extrapolation operation.

11. A vector quantizer as claimed in claim 9, wherein said operation data is calculated by interpolation operation.

12. A vector quantization method for performing vector quantization on input signal data, comprising the steps of:
   performing waveform extraction on said input signal data to output extracted waveform data; and
   generating index data based on the output extracted waveform data;
   wherein as index data to be generated based on predetermined extracted waveform data in which no watermark information is to be embedded, out of the output extracted waveform data, said index generating step randomly selects index data corresponding to the predetermined extracted waveform data from a plurality of index data which, when decoded, have amounts of errors falling within a predetermined range with respect to the predetermined extracted waveform data before decoding.

13. A vector quantization method as claimed in claim 12, further comprising the step of adding dummy data to a portion of said extracted waveform data when generating said extracted waveform data.

14. A vector quantization method for performing conjugate structure vector quantization on input signal data, comprising, comprising the steps of:
   performing waveform extraction on said input signal data to output extracted waveform data; and
   generating index data based on the output extracted waveform data;
   wherein as a combination of index data to be generated based on predetermined extracted waveform data in which no watermark information is to be embedded, out of the output extracted waveform data, said index generating step randomly selects a combination of index data corresponding to the predetermined extracted waveform data from a plurality of combinations of index data which, when decoded, have amounts of errors falling within a predetermined range with respect to the predetermined extracted waveform data before decoding.

15. A vector quantizer for performing vector quantization on input signal data, comprising:
   a time axis/frequency axis conversion and waveform extraction device that performs time axis/frequency axis conversion and waveform extraction on said input signal data to output frequency axis extracted waveform data; and
   an index generating device that performs vector quantization on the output frequency axis extracted waveform data to generate index data;
   wherein said index generating device adds watermark information data to at least one of a plurality of said frequency axis extracted waveform data corresponding to at least one frequency band component higher than a predetermined frequency.

16. A vector quantizer as claimed in claim 15, wherein said index generating device comprises a plurality of code books storing said index data in advance, and a plurality of encoding devices that assign said index data stored in respective corresponding ones of said code books to said frequency axis extracted waveform data, and wherein as index data to be assigned to said frequency axis extracted waveform data, one of said plurality of encoding devices corresponding to one frequency band component higher than said predetermined frequency randomly selects index data from a plurality of index data which, when decoded, have amounts of errors falling within a predetermined range with respect to the extracted waveform data before decoding, from among said index data stored in one of said code books corresponding to said one encoding device.

17. A vector quantizer as claimed in claim 15, wherein said index generating device comprises a plurality of code books storing said index data in advance, and a plurality of encoding devices that assign said index data stored in respective corresponding ones of said code books to said frequency axis extracted waveform data, and wherein in a case that there are a plurality of said encoding devices corresponding to frequency band components higher than said predetermined frequency, as index data to be assigned to said frequency axis extracted waveform data, at least one encoding device which is randomly selected from said plurality of encoding devices randomly selects index data from a plurality of index data which, when decoded, have amounts of errors falling within a predetermined range with respect to the extracted waveform data before decoding, from among said index data stored in at least one of said code books corresponding to said at least one encoding device.

18. A vector quantizer as claimed in claim 15, wherein said input signal data is audio data, said predetermined frequency being set based on human auditory sensation to a frequency at or above which little influence of watermark information can be exerted upon human auditory sensation.

19. A vector quantizer for performing vector quantization on input signal data, comprising:
   a time axis/frequency axis conversion and waveform extraction device that performs time axis/frequency axis conversion and waveform extraction on said input signal data to output frequency axis extracted waveform data; and
   a watermark information adding device that adds watermark information data to at least one of a plurality of the output frequency axis extracted waveform data which contains in large amounts frequency band components higher than a predetermined frequency, among frequency band components contained in said plurality of the output frequency axis extracted waveform data.

20. A vector quantizer as claimed in claim 19, further comprising:
   a time axis/frequency axis conversion device that performs time axis/frequency axis conversion on said input signal data to output frequency axis input signal data; and
   an interleave and waveform extraction device that interleave said frequency axis input signal data to generate interleaved frequency axis input signal data, and performs waveform extraction on said interleaved frequency axis input signal data to output frequency axis extracted waveform data.

21. A vector quantizer as claimed in claim 20, further comprising a watermark information adding device that adds watermark information data to at least one of a plurality of the output frequency axis extracted waveform data which contains in large amounts frequency band components higher than a predetermined frequency, among frequency band components contained in said plurality of the output frequency axis extracted waveform data.

22. A vector quantization method for performing vector quantization on input signal data, comprising the steps of:

performing time axis/frequency axis conversion and waveform extraction on said input signal data to output frequency axis extracted waveform data; and performing vector quantization on the output frequency axis extracted waveform data to generate index data;

wherein said index generating step adds watermark information data to at least one of a plurality of said frequency axis extracted waveform data corresponding to at least one frequency band component higher than a predetermined frequency.

23. A vector quantization method for performing vector quantization on input signal data, comprising the steps of:

performing time axis/frequency axis conversion and waveform extraction on said input signal data to output frequency axis extracted waveform data; and adding watermark information data to at least one of a plurality of the output frequency axis extracted waveform data which contains in large amounts frequency band components higher than a predetermined frequency, among frequency band components contained in said plurality of the output frequency axis extracted waveform data.

* * * * *